United States Patent
Bachmann et al.

(10) Patent No.: US 8,457,635 B2
(45) Date of Patent: Jun. 4, 2013

(54) NON-3GPP TO 3GPP NETWORK HANDOVER OPTIMIZATIONS

(75) Inventors: Jens Bachmann, Langen (DE); Shinkichi Ikeda, Kanagawa (JP); Kilian Weniger, Langen (DE); Takashi Aramaki, Osaka (JP)

(73) Assignee: Panasonic Corporation, Osaka (JP)

( * ) Notice: Subject to any disclaimer, the term of this patent is extended or adjusted under 35 U.S.C. 154(b) by 388 days.

(21) Appl. No.: 12/812,007

(22) PCT Filed: Jan. 8, 2009

(86) PCT No.: PCT/EP2009/000070
§ 371 (c)(1), (2), (4) Date: Sep. 8, 2010

(87) PCT Pub. No.: WO2009/087099
PCT Pub. Date: Jul. 16, 2009

(65) Prior Publication Data
US 2010/0323700 A1 Dec. 23, 2010

(30) Foreign Application Priority Data

Jan. 9, 2008 (EP) .................................... 08000304
Jan. 11, 2008 (EP) .................................... 08000514

(51) Int. Cl.
*H04W 36/00* (2009.01)
(52) U.S. Cl.
USPC .......................... 455/436; 455/437; 455/440
(58) Field of Classification Search
USPC .......................... 455/436, 437, 440
See application file for complete search history.

(56) References Cited

U.S. PATENT DOCUMENTS

| 2004/0137901 A1 | 7/2004 | Hamasaki |
| 2005/0070275 A1 | 3/2005 | Jeyaseelan |
| 2007/0249351 A1 | 10/2007 | An |
| 2009/0059829 A1 * | 3/2009 | Bachmann et al. ........... 370/311 |

FOREIGN PATENT DOCUMENTS

| EP | 1 662 726 | 5/2006 |
| EP | 1841142 A1 * | 10/2007 |
| EP | 2 007 161 | 12/2008 |
| GB | 2 348 570 | 10/2000 |
| KR | 10-0760957 | 9/2007 |
| WO | 2007/022301 | 2/2007 |

OTHER PUBLICATIONS

International Search Report dated Jul. 2, 2009.
European Search Report dated Apr. 29, 2009.

(Continued)

*Primary Examiner* — Marisol Figueroa
(74) *Attorney, Agent, or Firm* — Dickinson Wright PLLC

(57) ABSTRACT

The invention relates to a method for a handover of a mobile node from a non-3GPP to a 3GPP network, and of a mobile node, which is located in a non-3GPP/3GPP network. The handover is improved by discovering an appropriate MME and registering the mobile node at the discovered MME, in advance. This includes to first determine the location of the mobile node in the non-3GPP network, so as to be able to detect an MME in the vicinity of the mobile node's location. The 3GPP contexts are then transmitted to the new MME before the handover is performed. Moreover, the invention teaches to change the Serving-Gateway in the 3GPP network before performing a handover, thereby accelerating the handover. When a handover gets likely, the mobile node's location is determined and a new Serving-Gateway is selected. The data path is changed to go via the new Serving-Gateway.

11 Claims, 11 Drawing Sheets

OTHER PUBLICATIONS

European Search Report dated Jun. 27, 2008.

3GPP TSG SA WG2 Meeting #60b-SAE drafting ad-hoc, "Generic non-3GPP access to 3GPP access handover optimization without direct interface," Panasonic, Nov. 2007, TD S2-074879, XP-002486001, pp. 1-5.

3GPP TS 23.402 v8.0.0, "$3^{rd}$ Generation Partnership Project; Technical Specification Group Services and System Aspects; Architecture enhancements for non-3GPP accesses, Release 8," Dec. 2007, XP-050282133, pp. 1-131.

3GPP TS 36.938 v1.0.0, "3rd Generation Partnership Project; Technical Specification Group Radio Access Network; Improved Network Controlled Mobility between E-UTRAN and 3GPP2/Mobile WiMAX Radio Technologies," Oct. 2007, XP-002486003, pp. 1-35.

M. Lott, et al., "Interworking of WLAN and 3G systems," Wylan Systems and Interworking, IEE Proceedings-Communications, vol. 151, No. 5, Oct. 2004, pp. 507-513.

3GPP TS 23.401 v8.0.0, "3rd Generation Partnership Project; Technical Specification Group Services and System Aspects; General Packet Radio Service (GPRS) enhancements for Evolved Universal Terrestrial Radio Access Network (E-UTRAN) access, Release 8," Dec. 2007, pp. 1-168.

3GPP TS 23.402 v8.0.0, "3rd Generation Partnership Project; Technical Specification Group Services and System Aspects; Architecture enhancements for non-3GPP accesses, Release 8," Dec. 2007, XP-002486002, pp. 1-131.

\* cited by examiner

NON-3GPP TO 3GPP NETWORK HANDOVER OPTIMIZATIONS

FIELD OF THE INVENTION

The invention relates to a method for preparing and performing a handover of a mobile node from a non-3GPP network to a 3GPP network, and to a method for preparing a handover of a mobile node located in a non-3GPP network or a 3GPP network wherein the Serving-Gateway is changed. Furthermore, the invention relates to a mobile node and an entity, either in the non-3GPP or 3GPP network, that participate in the invention.

TECHNICAL BACKGROUND

UMTS (Universal Mobile Telecommunications System) is the 3G ($3^{rd}$ Generation) mobile communication system standardised by 3GPP ($3^{rd}$ Generation Partnership Project). The first release of the specification of UMTS was published in 1999 (Release 99). In the mean time several improvements to the standard have been standardized by the 3GPP in Release 4, Release 5 and Release 6. With the desire to support higher data rates, it was decided to develop a new Air Interface and also a new evolved radio access network, E-UTRAN (UMTS Terrestrial Radio Access Network). The 3GPP launched a study item "Evolved UTRA and UTRAN" better known as "Long Term Evolution (LTE)". The study will investigate means of achieving major leaps in performance in order to improve service provisioning, and to reduce user and operator costs. Out of that and because interworking with other radio access technologies should be possible, the need arose for a new evolved Packet Core Network.

An exemplary representation of the E-UTRAN architecture is given in FIG. 1. The E-UTRAN consists of evolved Node Bs (eNB or eNodeB), providing the E-UTRA user plane (PDCP/RLC/MAC/PHY) and control plane (RRC) protocol terminations towards the mobile node.

The eNB hosts the Physical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane. Further, it performs many functions including radio resource management, admission control, scheduling, enforcement of negotiated UL-QoS (Quality of Service), cell information broadcast, ciphering/deciphering of user and control plane data, and compression/decompression of DL/UL user plane packet headers. The eNBs are interconnected with each other by means of the X2 interface. The eNBs are also connected by means of the S1 interface to the EPC (Evolved Packet Core), more specifically to the MME (Mobility Management Entity) by means of the S1-MME, and to the Serving Gateway (S-GW) by means of the S1-U. The S1 interface supports a many-to-many relation between MMEs/Serving Gateways and eNBs.

The S-GW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and Packet Data Network Gateway). For idle state UEs, the S-GW terminates the DL data path and triggers paging when DL data arrives for the UE. It manages and stores UE contexts, e.g. parameters of the IP bearer service, network internal routing information. It also performs replication of the user traffic in case of lawful interception.

The MME is the key control-node for the LTE access-network. It is responsible for idle mode UE tracking and paging procedure including retransmissions. It is involved in the bearer activation/deactivation process and is also responsible for choosing the S-GW for a UE at the initial attach and at time of intra-LTE handover involving Core Network (CN) node relocation. It is responsible for authenticating the user (by interacting with the Home Subscriber Server, HSS). The Non-Access Stratum (NAS) signaling terminates at the MME and it is also responsible for generation and allocation of temporary identities to UEs. It checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN (Serving GPRS Support Node). The MME also terminates the S6a interface towards the home HSS for roaming UEs.

The Packet Data Network Gateway (PDN-GW) provides connectivity for the UE to external packet data networks by being the point of exit and entry of traffic for the UE. A UE may have simultaneous connectivity with more than one PDN-GW for accessing multiple PDNs. The PDN-GW performs policy enforcement, packet filtering for each user, charging support, lawful Interception and packet screening. Another key role of the PDN-GW is to act as the anchor for mobility between 3GPP and non-3GPP technologies.

To summarize the above, in order to support the new E-UTRAN access, the new 3GPP Core Network is mainly separated into three logical entities. At first, in the user plane the PDN-GW is the gateway to the external networks and the global mobility anchor for mobility between 3GPP and non-3GPP access technologies (like CDMA2000, WiMAX or WIFI). Second, another user plane entity being the Serving Gateway is the mobility anchor for mobility between 3GPP accesses (E-UTRAN, UTRAN, GERAN). Thirdly, a Mobility Management Entity is the control plane entity responsible for the mobility management of mobile terminals (also referred to in the following as UEs or MNs) moving between different EUTRAN base stations (eNodeBs) and also responsible for the session management.

The MMEs are connected to the eNodeBs, and one MME might be serving a number of eNodeBs so that multiple MMEs are necessary within the system to cover all eNodeBs. Furthermore, a pool of MMEs might be serving the same set of eNodeBs, e.g. for load balancing reasons.

As described above, the MME is responsible for mobility management and session management. For each mobile terminal attached to an MME, specific mobility management and evolved packet system context information is stored in the MME. These contexts comprise, e.g. the mobility state, the temporary identity, the current Tracking Area List, last known cell, authentication vectors, access restrictions, subscribed QoS profile, subscribed charging characteristics, and for each active PDN connection the APN (Access Point Name) in use, IPv4/IPv6 addresses, PDN-GW address for control plane, and also information for each EPS (Evolved Packet System) bearer within the PDN connection, as for example EPS bearer QoS profile, EPS bearer charging characteristics.

Furthermore, the context for a mobile terminal in an MME might be available even if the mobile terminal is detached from the 3GPP access. This context preservation allows for faster session setup when again switching on in the 3GPP access or when handing over from a non-3GPP access back to the 3GPP access, mainly because signaling with the Home Subscriber Server (HSS) is saved.

The mobility management within the 3GPP system is network controlled and two protocol variants are standardised for the interface between the PDN-GW and the S-GW. One is based on GTP (GPRS Tunneling Protocol), the protocol used in the legacy GPRS (General Packet Radio Service) system, and the other one is Proxy Mobile IPv6 (PMIPv6), developed in the IETF (Internet Engineering Task Force). For interworking with non-3GPP accesses, the mobile terminal can be connected to the Core Network, i.e. the PDN-GW, via PMIPv6 as well, in case the non-3GPP access supports PMIPv6. Alternatively, if the mobile terminal does not support inter-access handover with PMIPv6 or if the non-3GPP access does not support PMIPv6, the mobile terminal can be connected to the Core Network via Client Mobile IP versions, i.e. Mobile IPv4 Foreign Agent Mode (MIP4FA) or Dual Stack Mobile IPv6 (DSMIPv6).

Before a mobile terminal can access a non-3GPP access network, access authentication needs to be performed. If 3GPP based access authentication is applied in the non-3GPP access, i.e. the 3GPP AAA server/HSS authenticates the mobile terminal, EAP-AKA (Extensible Authentication Protocol-Authentication and Key Agreement) is used.

When the mobile terminal is active in a non-3GPP access network there is a local IP address used to route packets to the mobile terminal in the non-3GPP access. This IP address is the Care-of Address in the terminology of Mobile IP. In case of DSMIPv6, the address is assigned to the mobile terminal, and the mobile terminal is sending Binding Updates using its Care-of address to the PDN-GW, which has the function of the Home Agent (HA). In case of PMIPv6, the Care-of address is an address of a Mobile Access Gateway (MAG) that is located in the non-3GPP access network, and the MAG is sending Proxy Binding Updates using its (Proxy-) Care-of Address to the PDN-GW of the 3GPP network, which has the function of the Local Mobility Anchor (LMA).

A possibility to establish in advance contexts and resources in some 3GPP entities is to initiate said establishment by e.g. the AAA (Authentication, Authorization, Accounting) server or HSS by an event and without explicit signalling between the mobile terminal and the MME in the 3GPP access. The event can be for example the authentication of the mobile terminal in a non-3GPP access. In this scenario, in case the AAA server initiates the procedure, it may act as a proxy MME towards the HSS and request context for the mobile terminal and then push the context to the appropriate MME. Additionally the MME may then in advance setup contexts in the eNodeB and trigger bearer creation towards the S-GW.

In case of a handover from a non-3GPP access to a 3GPP access, the mobile terminal sends an Attach Request message to the MME in the 3GPP access (via the eNodeB) after discovering the 3GPP access. In the Attach Request message the mobile terminal indicates in an Attach Type field that it is a handover. In addition, the mobile terminal signals the old Global Unique Temporary Identifier (GUTI) for authentication. Then, the eNodeB derives from the GUTI the mobile terminal's MME and sends the Attach Request message to the MME. If the indicated MME is not associated with the contacted eNodeB, the eNodeB selects another MME and forwards the Attach Request message to this new MME. The new MME (if different from the old MME) retrieves the context (including IMSI, Authentication Quintets) from the old MME and can therefore skip part of the authentication procedure with the MN.

This above procedure is detailed in the following with reference to FIG. 2, which illustrates a signaling diagram for an E-UTRAN Initial Attach Procedure.

1. The UE initiates the Attach procedure by the transmission of an Attach Request message (IMSI or old GUTI, last visited TAI (if available), UE Network Capability, PDN Address Allocation, Protocol Configuration Options, Attach Type) together with an indication of the Selected Network to the eNodeB of the 3GPP network. The Attach Type indicates "Handover" in case the UE has already an activated PDN-GW/HA due to mobility within non-3GPP accesses.

2. The eNodeB derives the UE's MME from the GUTI and from the indicated Selected Network. If that MME is not associated with the eNodeB, the eNodeB selects an available MME for serving the UE. The selection is based on network topology, i.e. the selected MME serves the UE's location and in case of overlapping MME service areas, the selection may prefer MMEs with service areas that reduce the probability of again changing the MME. Other criteria for MME selection could include load balancing between MMEs. The eNodeB then forwards the Attach Request message to the new MME.

3. If the UE identifies itself with the GUTI and the MME has changed since detach, the new MME sends an Identification Request (old GUTI) to the old MME to request the IMSI pertaining to the UE. The old MME responds with an Identification Response (including IMSI, Authentication Quintets for the UE). If the UE is not known in the old MME, the old MME responds with an appropriate error cause.

4. If the UE is unknown in both the old MME and the new MME, the new MME sends an Identity Request to the UE to request the UE's IMSI. The UE responds with an Identity Response (IMSI).

5a. If no UE context for the UE exists anywhere in the network, authentication of the UE is mandatory. Otherwise, this step is optional; i.e. when context could be retrieved from the old MME. Authentication between the UE and the new MME is however still necessary.

6. If there are active bearer contexts in the new MME for this particular UE (i.e. the UE re-attaches to the same MME without having properly detached before), the new MME deletes these bearer contexts by sending Delete Bearer Request (TEIDs) messages to the GWs involved. The GWs acknowledge with Delete Bearer Response (TEIDs) messages.

7. If the MME has changed since the last detach, or if it is an Initial Attach, the new MME sends an Update Location message (MME Identity, IMSI, ME Identity) to the HSS.

8. The HSS sends a Cancel Location message (IMSI, Cancellation Type) to the old MME with the Cancellation Type set to Update Procedure. The old MME acknowledges with Cancel Location Ack (IMSI) and removes the MM (mobility management) and bearer contexts.

9. If there are active bearer contexts in the old MME for this particular UE (i.e. the UE did not properly detach before), the old MME deletes these bearer contexts by sending Delete Bearer Request (TEIDs) messages to the GWs involved. The GWs return Delete Bearer Response (TEIDs) messages to the new MME.

10. The HSS sends an Insert Subscriber Data (IMSI, Subscription Data) message to the new MME. The Subscription Data contains the list of all APNs (Access Point Names) that the UE is permitted to access, an indication about which of those APNs is the Default APN, and the 'EPS subscribed QoS profile' for each permitted APN. The new MME validates the UE's presence in the (new) TA. If due to regional subscription restrictions or access restrictions the UE is not allowed to attach in the TA, the new MME rejects the Attach Request with an appropriate cause, and may return an Insert Subscriber Data Ack message to the HSS. If all checks are successful, then the new MME constructs a context for the UE and returns an Insert Subscriber Data Ack message to the HSS. The Default APN shall be used for the remainder of this procedure.

11. The HSS acknowledges the Update Location message by sending an Update Location Ack to the new MME. If the Update Location is rejected by the HSS, the new MME rejects the Attach Request from the UE with an appropriate cause.

12. If the PDN subscription context contains no PDN-GW address, the new MME selects a PDN-GW. If the PDN subscription profile contains a PDN-GW address and the Attach Type does not indicate "Handover", the MME may select a new PDN-GW, e.g. to allocate a PDN-GW that allows for more efficient routing. The new MME selects a Serving-GW and allocates an EPS Bearer Identity for the Default Bearer associated with the UE. Then, it sends a Create Default Bearer Request (IMSI, MME Context ID, APN, RAT type, Default Bearer QoS, PDN Address Allocation, AMBR, EPS Bearer Identity, Protocol Configuration Options, ME Identity, User Location Information) message to the selected Serving-GW.

13. The Serving-GW creates a new entry in its EPS Bearer table and sends a Create Default Bearer Request (IMSI, APN, Serving GW Address for the user plane, Serving GW TEID of the user plane, Serving GW TEID of the control plane, RAT type, Default Bearer QoS, PDN Address Allocation, AMBR, EPS Bearer Identity, Protocol Configuration Options, ME Identity, User Location Information) message to the PDN-GW. After this step, the Serving GW buffers any downlink packets it may receive from the PDN-GW until receiving the message in step 21 below.

15. The PDN-GW returns a Create Default Bearer Response (PDN-GW Address for the user plane, PDN GW TEID of the user plane, PDN GW TEID of the control plane, PDN Address Information, EPS Bearer Identity, Protocol Configuration Options) message to the Serving-GW.

16. The Serving-GW returns a Create Default Bearer Response (PDN Address Information, Serving GW address for User Plane, Serving GW TEID for User Plane, Serving GW Context ID, EPS Bearer Identity, Protocol Configuration Options) message to the new MME. PDN Address Information is included if it was provided by the PDN-GW.

17. The new MME sends an Attach Accept (APN, GUTI, PDN Address Information, TAI List, EPS Bearer Identity, Session Management Configuration IE, Protocol Configuration Options) message to the eNodeB. GUTI is only included if the new MME allocated a new GUTI.

18. The eNodeB sends a Radio Bearer Establishment Request including the EPS Radio Bearer Identity to the UE, and the Attach Accept message will be sent along to the UE.

19. The UE sends the Radio Bearer Establishment Response to the eNodeB. In this message, the Attach Complete Message (EPS Bearer Identity) will be included.

20. The eNodeB forwards the Attach Complete (EPS Bearer Identity) message to the new MME. After the Attach Accept message and once the UE has obtained a PDN Address Information, the UE can then send uplink packets towards the eNodeB which will then be tunnelled to the Serving-GW and PDN-GW.

21. The new MME sends an Update Bearer Request (eNodeB address, eNodeB TEID) message to the Serving-GW.

22. The Serving GW acknowledges by sending Update Bearer Response (EPS Bearer Identity) message to the new MME. The Serving GW can then send its buffered downlink packets.

23. After the MME receives an Update Bearer Response (EPS Bearer Identity) message, if an EPS bearer was established and the subscription data indicates that the user is allowed to perform handover to non-3GPP accesses, and if the MME selected a PDN-GW that is different from the PDN-GW address which was indicated by the HSS in the PDN subscription context, the MME shall send an Update Location Request including the APN and PDN-GW address to the HSS for mobility with non-3GPP accesses.

24. The HSS stores the APN and PDN-GW address pair and sends an Update Location Response to the MME.

The above explanation of the signalling diagram in FIG. 2 is quite detailed and considers many cases. For simplicity it will be now assumed that a UE is first located in a 3GPP network area, and thus is registered to an MME, including the establishment of context information in the MME. When leaving the 3GPP network into a non-3GPP network, the MME still maintains the context information. However, when eventually returning to the 3GPP network, the UE has moved far away and attaches to an eNodeB, which does not belong to the old MME. Therefore, the old MME can no longer be used, and another MME has to be selected. It is further assumed that the old MME pushes the UE's context information to the new MME. Due to the change of MME, the steps 3, 7, 8, 10 and 11 of the method in FIG. 2 have to be conducted. Step 4 and part of step 5 are not necessary since by retrieving the UE's context information from the old MME, only authentication between MN and the new MME is necessary. In other words, though the new MME does not need to retrieve the authentication vector from the HSS, the UE however still needs to authenticate itself with the new MME. Step 6, relating to bearers which could be still active in the S-GW/PDN-GW for the new MME, would not be necessary since it is assumed that the MN attaches for the first time to the new MME. Further, step 9, relating to deleting bearers in the S-GW/PDN-GW for the old MME, is only necessary if the MN did not correctly detach or handover from the old MME. During the detach or handover procedure from the old MME, the bearers with the S-GW/PDN-GW should have been deleted. However, in case the mobile node is merely switched-off and later switched-on again in the non-3GPP network, it might be that there are still bearers active between the old MME and the S-GW/PDN-GW, in which case step 9 would have to be performed.

It might be even that the old MME deleted the UE contexts, which are thus not available for the new MME, in which case the steps 4 and 5 would have to be conducted as well. This is similar to another exemplary scenario in which the UE made the Initial Attach in the non-3GPP network, and attaches for the first time in the 3GPP network area.

Anyway, these steps (at least steps 3, 7, 8, 10 and 11) introduce an additional delay in the handover procedure.

According to a first set of problem, especially in the case where simultaneous connectivity with multiple radio interfaces is not possible, this MME relocation introduces additional signalling and leads to a handover delay and may cause an interruption of ongoing sessions.

The above architecture describes the non-roaming variant, i.e. the non-3GPP access, the mobile terminal is connected to, has a direct roaming relationship with the home operator of the mobile terminal.

Referring to a second set of problems, however if the non-3GPP access does not have direct roaming relationship with the home operator, a possible variant for the mobile terminal to connect to a PDN-GW in the Home Public Land Mobile Network (HPLMN) is to use a Serving Gateway (S-GW) in a Visited Public Land Mobile Network (VPLMN) as an intermediary between the MAG in the non-3GPP access network and the PDN-GW. Such a connection is called "Chained connection" or "Chaining". In the Chaining case, the AAA Proxy selects the S-GW in the VPLMN and notifies the MAG in the non-3GPP access about it.

There two types of the Chaining, wherein in both cases PMIPv6 is always applied between the MAG and the S-GW. One case is to use the PMIPv6 Protocol for the signalling and PMIP tunnel for user data transport between the PDN-GW and the S-GW. In this type of the Chaining, the S-GW acts as a PMIP relay which transfers the PBU, PBA and user data between the PDN-GW and the MAG. Another type of the Chaining is to use the GPRS Tunnelling Protocol (GTP) for the signalling and the user data transport between the S-GW and the PDN-GW. In this case, the S-GW acts as a signalling gateway for PMIP and GTP, and also as tunnel-concatenator for the PMIP tunnel and the GTP tunnel between the PDN-GW and the MAG.

In case of a handover of the mobile terminal from the non-3GPP access Chaining case to the 3GPP access network, the previously used S-GW might also need to be relocated. As this S-GW relocation is performed by the MME, the selected S-GW for the 3GPP access network could be different from the former S-GW that was selected by the AAA Proxy and used from the non-3GPP access network.

In addition, there can be other scenarios in which it is necessary to change the Serving-GW. For instance, according to local policy, a specific S-GW is only to be used for MNs in the 3GPP network, but not for those in the non-3GPP network. Thus, when a MN moves to a non-3GPP network area, a new S-GW (e.g. only for MNs in the non-3GPP network) has to be selected, and the data path from the PDN-GW to the MN is relocated to go via the new S-GW instead of via the old S-GW.

Furthermore, during intra-technology handovers, i.e. within the non-3GG network respectively the 3GPP network, a change of the S-GW might be advantageous (e.g. due to route optimizations. Also in this case, the S-GW relocation during the handover takes time and lengthens the handover duration, this being a second problem encountered during handovers.

SUMMARY OF THE INVENTION

Therefore, in view of the first set of problems in the state of the art, one object of the invention is to provide an improved method for performing a handover of a mobile node from a non-3GPP network to a 3GPP network. According to the second problems of the state of the art, one object of the invention is to provide an improved method for performing a handover of a mobile node between a non-3GPP network and a 3GPP network.

At least one of the above objects is solved by the subject matter of the independent claims. Advantageous embodiments of the invention are subject-matters of the dependent claims.

According to a first aspect of the invention for solving the first set of the above-mentioned problems, the handover procedure of the mobile node when moving from a non-3GPP system to a 3GPP system can be improved by discovering and registering the new MME in advance. This includes the relocation of the relevant contexts from the old MME to the new MME before the actual handover is performed. Therefore, when the MN performs the handover to the 3GPP access, the Attach Request message transmitted by the MN already includes the identifier of the discovered new MME. Thereby, any disadvantages stemming from when having to change the MME during handover are eliminated.

According to a second aspect of the invention for solving the second problem of the prior art, it is important to prepare and perform the Serving-Gateway relocation (data path switching) before the actual handover takes place, in order to accelerate the later handover. Accordingly, a new Serving-Gateway is selected based on previously determined location information of the mobile node. Subsequently, the data path on which data packets are exchanged between the packet data network gateway and the mobile node is changed such that the data packets are exchanged via the new Serving-Gateway. Either the old Serving-Gateway forwards the data packets to the new Serving-Gateway or the new Serving-Gateway directly exchanges the data packets with the packet data network gateway.

It is important for said second aspect of the invention that the principles can be applied to any handover of the mobile node, be it within the 3GPP network, within the non-3GPP network, between the 3GPP network and the non-3GPP network or between the non-3GPP network and the 3GPP network. A Serving-Gateway is usually always used, and thus can be re-located when appropriate, independent on the kind of handover which is going to be performed.

Though in the following only the Chained case and the handover from the non-3GPP network to the 3GPP network, will be explained in more detail, this is not to be construed as limiting the invention. Other scenarios, as explained above, are possible, and the principles of the invention can be applied thereto as well.

One embodiment of the invention provides a method for preparing and performing a handover of a mobile node from a non-3GPP network area to a 3GPP network area. The mobile node is attached to the non-3GPP network area. The location of the mobile node is determined, on which base in turn a mobility management entity in the 3GPP network area is determined. The mobile node is registered at the determined mobility management entity, and the handover from the non-3GPP network area to the 3GPP network area is performed. The mobile node indicates the determined mobility management entity when attaching to the 3GPP network area.

According to an advantageous embodiment of the invention, the determining of the location of the mobile node can be conducted by the mobile node or an entity in the non-3GPP network area or the 3GPP network area. For instance, in case the Care-of address of the MN is used, the Packet Data Network-Gateway in the 3GPP network area can infer the mobile node's location therefrom.

In a further embodiment of the invention the determining of the mobility management entity is conducted by the mobile node or an entity in the 3GPP network or the non-3GPP network. In particular, the Mobile Access Gateway in the non-3GPP network can have some MMEs pre-configured which can then be used in said respect.

Referring to a more specific embodiment of the invention, information on the determination of the location of the mobile node is provided to the entity that determines the second mobility management entity for enabling the entity to perform the determination based on the location of the mobile node.

According to another embodiment of the invention, the mobile node and an entity in the 3GPP network area, that conducts the step of registering the MN, are provided with information on the determined mobility management entity. This is advantageous since both the 3GPP network area and the MN need to know about the selected MME, in order to respectively register the MN in the new MME and signalling the new MME when attaching to the 3GPP network.

Regarding a different embodiment of the invention, when the mobile node determines the mobility management entity, information on the determined mobility management entity is transmitted to an entity in the 3GPP network area for conducting the step of registering the MN within a binding update message. One advantage is that no new message has to be defined in order to transmit said information on the mobility management entity.

In an advantageous embodiment of the invention, the determining of the location of the mobile node is based on a location-dependent address of the mobile node in the non-3GPP network area.

In an alternative embodiment of the invention, the determining of the location of the mobile node is based on radio measurements on the non-3GPP network area or on the 3GPP network area at the location of the mobile node.

According to a more specific embodiment of the invention, the radio measurements are conducted by an entity in the non-3GPP network area. Further, the mobile node instructs the entity in the non-3GPP network about which radio measurements to conduct.

According to another embodiment of the invention, the radio measurements are initiated when the likelihood for a handover of the mobile node from the non-3GPP network area to the 3GPP network area exceeds a predetermined level. Thus, the radio measurements are only conducted when needed, thereby alleviating the additional load and resource usage generated by the radio measurements.

In a further embodiment of the invention, the likelihood for a handover of the mobile node is based on the network deployment of the non-3GPP network area and/or the 3GPP network area at the location of the mobile node.

According to a different embodiment of the invention, the likelihood for a handover of the mobile node increases with a decrease of a radio signal strength received out of the non-3GPP network area.

With regard to another embodiment of the invention, the mobile node is registered in a previous mobility management entity in the 3GPP network area. In said embodiment, the radio measurements are initiated when the likelihood for changing the previous mobility management entity to the mobility management entity exceeds a predetermined level.

In a more detailed embodiment of the invention, a timer is started when the mobile node is registered at the previous mobility management entity. Accordingly, when the timer expires, the likelihood for changing the previous mobility management entity exceeds the predetermined level.

Referring to an advantageous embodiment of the invention, the determining of the mobility management entity is based on a database containing information on mobility management entities.

According to a further embodiment of the invention, the determining of the mobility management entity uses an algorithm for constructing an identifier of the mobility management entity out of parameters pertaining to the location of the mobile node.

In another embodiment of the invention context information, pertaining to the mobile node, is transmitted from a previous mobility management entity or from a home subscriber server or from an authentication entity of the 3GPP network to the mobility management entity.

A further embodiment of the invention provides a mobile node for preparing and performing its handover from a non-3GPP network area to a 3GPP network area. The mobile node is attached to the non-3GPP network area. A processor of the mobile node determines the location of the mobile node and further determines a mobility management entity in the 3GPP network area based on the determined location of the mobile node.

A transmitter of the mobile node transmits information on the determined mobility management entity to an entity in the 3GPP network area or non-3GPP network area for registering the mobile node at the determined mobility management entity. The processor performs the handover from the non-3GPP network area to the 3GPP network area while indicating the determined mobility management entity when attaching to the 3GPP network area.

Another embodiment of the invention provides an entity in a non-3GPP network area or 3GPP network area for preparing a handover of a mobile node from a non-3GPP network area to a 3GPP network area. The mobile node is attached to the non-3GPP network area. A processor of the entity determines the location of the mobile node and further determines a mobility management entity in the 3GPP network area based on the determined location of the mobile node. In addition, the processor registers the mobile node at the determined mobility management entity. Then, a transmitter transmits information on the determined mobility management entity to the mobile node.

BRIEF DESCRIPTION OF THE FIGURES

In the following the invention is described in more detail with reference to the attached figures and drawings. Similar or corresponding details in the figures are marked with the same reference numerals.

DETAILED DESCRIPTION

Definitions

Figure 1:
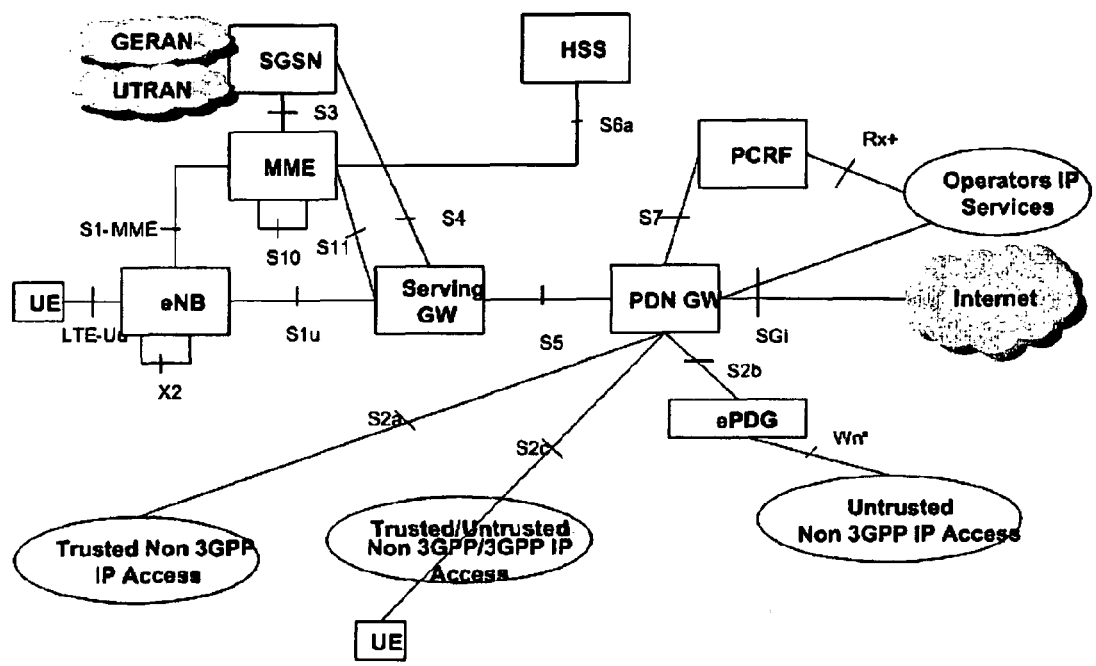
FIG. 1 illustrates the high-level architecture of an LTE system.

In the following a definition of a few terms frequently used in this document will be provided.

A mobile node is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over it may communicate with other functional entities or correspondent nodes.

A 3GPP system is a communication system standardised by the 3GPP consisting of a 3GPP core network and a 3GPP radio access network.

A 3GPP core network is related to the part of the 3GPP system which consists of physical entities that are independent of the connection technology of the terminal (e.g. radio, wired).

A 3GPP access network is related to the part of the 3GPP system which consists of entities dependent on the 3GPP radio access technology, e.g. the base station.

A non-3GPP access network is a communication system consisting of entities providing nodes connectivity to a network independent from a 3GPP system.

The following paragraphs will describe various embodiments of the invention.

According to one embodiment of the first aspect of the invention, a method is provided to improve a handover procedure of a mobile node to a 3GPP network. The MN is assumed to be currently moving within the non-3GPP network performing intra non-3GPP handovers from one Access Router to another. One principle of the embodiment of the invention is to prepare the possible handover to the 3GPP network in advance. In more detail, when the MN conducts a handover to the 3GPP network, it needs to register with a mobility management entity. Thus, the actual handover can be accelerated by selecting the MME and already registering the MN with the selected MME in advance. Accordingly, when performing the actual handover, the registration with the MME is already done and the handover duration can be shortened.

To said end, it is necessary to first determine the MN's location during the time when moving in the non-3GPP network. This can be done by the MN itself, by another entity in the non-3GPP network or by an entity in the 3GPP network. In either case, it is possible to identify the location of the MN by e.g. analyzing the current address of the MN in the non-3GPP network, which is location-dependent. Alternatively, radio measurements on the 3GPP network or the non-3GPP network can also provide information about the current position of the MN.

There are basically two cases: firstly, the MN has switched-on in the non-3GPP network and has thus no MME registered in the 3GPP network, or the MME to which the MN was previously registered in the 3GPP network does not hold any mobility contexts for the MN; secondly, the MN is registered with an MME in the 3GPP network, which also maintained the contexts pertaining to the MN. Determining the current location of the MN in the non-3GPP network is important for both cases. For one thing, the MN's current location allows to infer whether the old MME is still valid when attaching to the closest 3GPP access; the eNodeB might not belong to the old MME, and thus a new MME would have to be selected, based on the MN's current location. For another thing, if no MME is yet assigned to the MN, an MME has to be selected according to the MN's current position.

In summary, it is necessary to make a decision on whether to change the MME (case 1), and it is necessary to determine a new MME (case 1 & 2). The decision and determination can be conducted by either the MN or an entity in the 3GPP network, such as a PDN-GW or an entity in the non-3GPP network, such as the Mobile Access Gateway. Naturally, the entity which performs the decision and determination, be it the MN or the entity in the 3GPP or non-3GPP network, has to be provided with the information on the MN's current position in the non-3GPP network. This depends of course on which entity identified the location of the MN in the previous step. For instance, in case the MN determines its own location and also decides on whether to change its MME and/or selects a new MME, the necessary information is already present in the MN. Thus, no additional exchange of data on the location of the MN is necessary in said case.

However, in case the first entity for determining the location and the second entity for deciding whether change to a new MME or not and for determining the new MME are different from each other, the second entity needs to be provided with the MN's location information so as to be able to make its decision and determination.

Accordingly, it should be obvious for the skilled person to adapt the above comments on information exchange to the different constellation of first and second entities in the non-3GPP and 3GPP network.

After having pinpointed the MN in the non-3GPP network and determined the new MME, the MN needs to be registered in the new MME. To said end, an entity in the 3GPP network needs to be provided with the identity of the new determined MME, so as to be able to carry out the registration of the MN in the MME. The registration includes transferring the relevant context information of the MN to the new MME. The MN's context information can be either retrieved from the old MME (in case the old MME still holds these contexts) or from another entity in the 3GPP network responsible in said respect, for example the HSS.

In either way, the MN is thereby successfully registered in the new MME.

The relocated MME can be used for only a limited region, and thus the above-illustrated procedure needs to be performed successively while the MN is moving in the non-3GPP network. Consequently, the MN is thus registered at all times with an MME of the 3GPP network which, in accordance with the MN's current location, can be used when the MN actually hands over to the 3GPP network.

Eventually, the MN will leave the area covered by the non-3GPP network, and will thus attach to an eNodeB of the 3GPP network. When performing the handover from the non-3GPP network to the 3GPP network, the MN is already successfully registered in a corresponding MME, associated to the eNodeB. Therefore, there is no need to perform a registration with an MME during the handover, and thus the handover procedure can be carried out in a shorter time. No additional delay is introduced to the handover procedure by discovering and performing a registration for a new MME, for those cases in which the MN's MME of the 3GPP network is no longer usable due to the change of location of the MN or in which no MME at all was previously assigned to the MN at the time of handover to the 3GPP network.

When attaching to the 3GPP network, the MN needs to identify the new MME that holds the MN's contexts. This can be signaled with the first attach message sent to the eNodeB, the eNodeB in turn forwarding the attach message to the identified MME. Naturally, for those cases in which the mobile node does not determine for itself the new MME, the MN needs to be provided with information on the new MME, so as to be able to specify its appropriate MME when attaching to the 3GPP network (eNodeB).

The previously illustrated embodiment of the invention is a mere example of how to implement the principles of the first aspect of the invention. In the following, more detailed embodiments of the invention will be set out. The embodiments below however shall not be understood as limiting the scope of the invention, but shall be taken as a guide for a skilled person on how to apply the invention. Consequently, other embodiments of the invention will become obvious to the skilled person when studying the exemplary embodiments below.

Each of the above mentioned steps of the first aspect of the invention can be conducted in different ways, as will be detailed in the following. We will first refer to the step of determining the location of the MN in the non-3GPP network.

Mobility in the non-3GPP access network is based either on DSMIPv6, MIP4FA or on PMIPv6. Thus, the Care-of Address, or the prefix of this IP address, can be used to determine the location of the mobile node. Similarly, in case of PMIPv6, a MAG is used for mobility of the MN in the non-3GPP network, and the corresponding Proxy Care-of address of the MAG can be used to identify the location of the MN. Another variant instead of using the Proxy Care-of Address of the MAG, is to use the MAG's link layer address, since the mobile node does not know the Proxy Care-of Address used by the MAG.

Yet another variant to determine the MN's current location in the non-3GPP network refers to the case in which network access authentication has to be performed with the home AAA server. In said case, the Network Access Server (NAS) IP address of the non-3GPP network that is included in AAA messages to the home AAA server can be used. For example, in a scenario with WLANs, the UE may move from one WLAN operator's network to another WLAN operator's network and thus change the NAS. In said case the NAS IP address may give a hint to the location of the UE.

A different possibility for location determination of the MN is to use radio measurements. This can be e.g. measurements of the other technology, i.e. of the 3GPP radio access. These measurements can be performed for example by the mobile node during gaps in the transmission on the non-3GPP access. Possible parameters that can be measured are: Cell ID, signal strength, Tracking Area (TA) or Location Area/Routing Area (LA/RA) in case of 2G/3G, PLMN identities, access limitation/restriction. It is possible to derive the location of the MN from these parameters.

One possible enhancement here in addition to the just-mentioned 3GPP radio parameters is, that an MME identifier may be broadcasted by the 3GPP access. Only mobile terminals active in the non-3GPP access use this MME identifier, and this MME always keeps the context for these mobile terminals. In more detail, an MME serves a number of eNodeBs in an area. The operator may have assigned one dedicated MME in the area only for non-3GPP handover. The identifier of this MME is then broadcasted by the eNodeBs in this area. Thus, the location of the MN is known on granularity of this MME.

But also measurements of the non-3GPP radio access can be used to determine the location of the MN. For example a 3GPP neighbouring cell list or a Tracking Area or MME identifier can be broadcasted over the non-3GPP radio.

However, instead of the mobile terminal performing the measurements of the 3GPP radio access, it is also possible that an entity in the non-3GPP access network has the capability to measure the 3GPP radio access. For example, if the non-3GPP base stations are equipped with 3GPP radio interfaces, these can be used to measure the 3GPP access in the vicinity of the non-3GPP access base station. This would be advantageous in case measurement gaps are not available during the transmission in the non-3GPP access and thus the mobile terminal can not do the measurements on its own.

According to another embodiment of the invention, in case the non-3GPP access network (base station) is doing measurements and sends the results to the mobile terminal, it is possible to limit the reported measurements to only necessary information. To said end, the mobile node can trigger the non-3GPP access to measure and inform the base station of the non-3GPP access beforehand about the necessary information. In addition, the mobile node might also convey parameters that help the base station in the non-3GPP access network to limit the reported measurements. Thus, for example the mobile node might send to the non-3GPP access network's base station the mobile terminal's last TA (Tracking Area), TAs equivalent to the last TA, HPLMN (Home Public Land Mobile Network), supported 3GPP RATs (E-UTRAN/UTRAN/GERAN) and/or supported 3GPP frequencies.

For instance, after providing the non-3GPP access (e.g. base station) with the information about the last used Tracking Area and those equivalent Tracking Areas, the non-3GPP access needs to inform the mobile node only if neither the last used TA nor one of the equivalent TAs is available in the measurement range of the non-3GPP access. In other words, the non-3GPP does not need to inform the MN about measured TAs if one of the TAs is already known by the MN (e.g. last used TA or equivalent TA), because then an MME that is serving the TA has already the MN's context.

Furthermore, if none of the TAs is available, then, in order to enable the non-3GPP access to report useful 3GPP parameters to the mobile terminal, the non-3GPP access should report in the first place Tracking Area Identities with the same MCC (Mobile Country Code) and MNC (Mobile Network Code) as the last used TA or the HPLMN of the mobile terminal. In said case, the mobile terminal needs to also inform the non-3GPP access about its HPLMN. Though in general the MN's location can be inferred from any TA, the non-3GPP access should not measure Tracking Areas from other operators (i.e. with different MCC and MNC). The location determination function may not have location information about TAs that are different from the current operator or the home operator. Thus, it is advantageous to concentrate on TAs of operators that are known and not to report a large number of possible TAs from other operators as well.

Similarly, with the information about the supported 3GPP RATs and supported 3GPP frequencies, the non-3GPP access is able to report only Tracking Areas that belong to the supported ones.

Other information that can be optionally informed to the non-3GPP access is, the minimum signal strength. Said parameter might be helpful if the mobile terminal does not want to trigger MME re-assignment for Cells with bad connection quality. Thus, when later determining a new MME, the signal strength can be used to prioritize one MME over another, in case several MMES are available.

Further, the movement behaviour of the MN (e.g. previous non-3GPP Access Point) could also be transmitted to the non-3GPP access performing the radio measurements. In case the MN is moving in a specific direction, said information could limit the radio measurements to those areas between the old and the probable next Access Point.

In order to reduce the measurements performed by the non-3GPP access, the non-3GPP access may report the stored result of a recent measurement performed for another mobile node at the same location as the mobile node.

Another alternative is that the non-3GPP access reports 3GPP parameters but without performing 3GPP radio measurements. This is possible in case a mobile terminal that hands over from the 3GPP access to the non-3GPP access is reporting the last used TA to the non-3GPP access. This TA can be stored by the non-3GPP access, and when another mobile terminal requests the available TAs in the vicinity of the non-3GPP access, the non-3GPP access can report the TAs it has collected from other mobile terminals reports.

In the above cases it is necessary to provide the non-3GPP access entity, performing the radio measurements, with information on the MN, i.e. the above mentioned MN's parameters so as to limit the measurements. However, this results in an increased load on the radio link between the MN and the non-3GPP access entity (e.g. base station). The increased load on the radio link can be avoided, if the context about said MN's parameters is transferred during intra non-3GPP access handovers, i.e. between different APs in the non-3GPP network.

Thus, the mobile node triggers only once the non-3GPP access to measure, and subsequently, the trigger, together with context information containing the MN's parameters, is forwarded by the old non-3GPP Access Point to the current non-3GPP Access Point by context transfer.

One problem of continuously performing radio measurements is higher power consumption, and another problem is the increased load due to informing and reporting the results. Therefore, it is desirable to reduce as much as possible the measuring, informing and reporting, while the MN is active in the non-3GPP access network.

Thus, the mobile node should measure or trigger measuring only if a handover to 3GPP access is getting more likely. In order to determine whether a handover is getting more likely, there are several possibilities. For instance, the non-3GPP access points might retrieve information (for example by using neighbour graphs) about the deployment of the non-3GPP access network, which gives an indication about whether non-3GPP access is everywhere available in the vicinity of the current non-3GPP access point or not. Or if non-3GPP access is everywhere available in the movement direction of the mobile terminal or not. In case non-3GPP access is not everywhere available, i.e. there is a border of non-3GPP coverage, the current non-3GPP access point might broadcast or signal dedicatedly to the mobile node that non-3GPP access coverage might be lost. In said case radio measurements would be conducted by the MN or triggered by it.

The non-3GPP access might also inform the mobile node about a neighbour non-3GPP access cell list, and if the number of neighbour cells decreases, the mobile terminal may start measuring the 3GPP access or trigger another entity to do so.

One possibility for the non-3GPP access to discover the deployment of the non-3GPP network is when a mobile node is doing a handover from a 3GPP access network to a non-3GPP access network. Then, the MN may inform the non-3GPP Access Point that it is coming from a 3GPP access. Thus, the non-3GPP Access Point learns whether handover to a 3GPP access is possible or not at a particular location. If the mobile nodes have performed handover from a 3GPP to a non-3GPP access in the past, the non-3GPP Access Point broadcasts or signals dedicatedly to the mobile terminal that non-3GPP access coverage might be lost. This again would prompt the MN to either initiate radio measurements itself, or trigger another entity to perform the radio measurements. If no mobile nodes have performed a handover from a 3GPP to a non-3GPP access, the non-3GPP Access Point does not broadcast such information.

Alternatively to the above, the mobile node may start to (or trigger another entity to) measure e.g. the 3GPP access if the signal strength of the current non-3GPP access base station decreases and the signal strength of no other non-3GPP base station starts to increase. Or instead of the signal strength, the number of scanned non-3GPP access base stations is used as a trigger, i.e. if the number of the base stations in the non-3GPP access is below a certain threshold, the mobile terminal starts to (or triggers another entity to) measure.

Another possibility to discover the likelihood of inter-access handovers is when the mobile terminal stores its own movement patterns and therefore learns whether non-3GPP access coverage is available or not. In particular, the mobile terminal can detect whether its current movement matches to any stored pattern, and based on the stored moving pattern, the mobile terminal knows at what point a handover to 3GPP access has occurred in the past, and thus it can decide when to start with measuring or triggering the radio measurements.

Different from the above decision, which is based on the non-3GPP access deployment or coverage, the measuring, informing and reporting can be also started when a change of the MME is getting more likely. For example, when the MME re-assignment has been performed for a mobile node, a timer is started, and 3GPP measurements are not performed until the timer expires. Alternatively, this timer might be dynamically too, e.g. depending on the speed of the mobile terminal. More specifically, if the mobile node moves slowly, the timer starting value is higher, and if the mobile terminal moves fast, the timer starting value is lower. Also, the timer may move faster or slower depending on the MN's speed, in which case the timer operation can be continuously adapted to the MN's movements.

Another example to control the measuring, informing and reporting is to not perform 3GPP measurements for a fixed number of handovers to different non-3GPP Access Points, when MME re-assignment has been performed for a mobile terminal recently. If the number of handovers exceeds a fixed number, 3GPP measurements can be started again.

There are also different options on how to select the new MME. As already mentioned, after the information related to the mobile terminal's location has been collected, somehow the appropriate MME, that will be close to the mobile terminal when handing over to 3GPP access, needs to be determined.

One way to find out the MME is to have a database in the network and/or in the mobile terminal with entries of MMEs mapped to the collected information or location of the MN. For example, if the information used to determine the MME is based on the Care-of Address prefix, then for each prefix there is an entry with an MME identifier, or if the information is based on the measured Tracking Area, then for each TA there is an entry with an MME identifier. Naturally, other possibilities are conceivable in said respect, and the skilled person would be able to infer them from the description.

However, also an MME determination without database is possible. In particular, an algorithm or function can be used that constructs an MME identifier out of specific input parameters. One example is that the measured Tracking Area Code and PLMN identity are used for the construction. The MME identifier can be constructed by concatenating the MNC (Mobile Network Code)+MCC (Mobile Country Code) from the PLMN identity (discovered during 3GPP measurements) with parts from the Tracking Area Code TAC (for example the first x bits) and with some fixed preconfigured value, that always identifies those MMEs in the 3GPP network that are used for non-3GPP to 3GPP handover optimizations according to the different embodiments of the invention.

Exemplary, the determined MME identifier would then have the following format:

| MNC + MCC (17 bit) | TAC (first 16 bit) | Fixed value, e.g. 00000001 (8 bit) |
|---|---|---|

With the MME determination not only any MME should be determined, but also a favourable MME for later TA updates. In more detail, if there are different MMEs serving different TAs but also common TAs, the MME selection function should prefer the MME with the served TAs that reduces the probability of again changing the MME, e.g. by taking the movement history of the mobile terminal into account. Thus, the past locations of the mobile terminal should be stored.

In the following, the information exchange between the mobile node and the different entities in the 3GPP and the non-3GPP system while performing the different steps of the embodiments of the invention, will be explained in more detail.

As mentioned in the previous sections, there are various options for the information gathering and for the MME determination. In dependence on the option, the parameters to perform measuring and/or the measurement result and/or the result of the MME determination need to be exchanged between different entities.

Some options have been identified below. However, due to the vast number of possible options, not all options are included in the below listing. Thus, the listing is not to be construed as limiting the scope of the invention, but merely as some possible embodiments which could be adapted otherwise by a skilled person when considering the remaining description of the invention. For instance, the cases in which an entity in the 3GPP system performs the location determination of the MN and/or an entity of the non-3GPP system determines the new MME have been omitted from the below listing.

1. Location of MN is determined based on
   a. Information (e.g. radio measurements and/or L2/L3 address information, such as the MAC address or IP address of the AP, MAG or AR) discovered by the mobile terminal
   b. Information discovered by the non-3GPP access
   c. Information discovered by both, mobile terminal and non-3GPP access
2. MME is determined by
   a. the mobile terminal
   b. the 3GPP network
   c. both, mobile terminal and 3GPP network The requirements for the information exchange are described below, based on some meaningful combinations of the above options:

In case of 1a and 2a, the mobile terminal needs to inform the 3GPP system about the selected MME, so that the 3GPP network can trigger the context establishment in the selected MME.

In case of 1a and 2b, the mobile terminal needs to inform the 3GPP network about the discovered information in order to let the 3GPP network determine the MME. Further, the 3GPP network needs to inform the mobile terminal about the determined MME identifier in order to let the MN use the identifier when attaching to the 3GPP access during handover.

In case of 1a and 2c, the mobile terminal needs to inform the 3GPP network about the discovered location information.

In case of 1b and 2a, the mobile terminal may need to inform the non-3GPP access about measurement parameters in order to make measuring and reporting more efficient. Then, the non-3GPP access needs to inform the mobile terminal about the discovered information so that the MN is able to determine a new MME. Finally, the MN needs to inform the 3GPP network about the selected MME for the 3GPP network to establish the contexts in the identified MME.

In case of 1b and 2b, the mobile terminal may need to inform the non-3GPP access about measurement parameters for limiting the radio measurements, then either the non-3GPP access needs to inform the 3GPP system about the discovered information for determining the next MME. Further, the 3GPP network needs to inform the mobile terminal about the determined MME identifier for later handover; or the non-3GPP access needs to inform the mobile terminal about the discovered information, then the mobile terminal needs to inform the 3GPP network about the information for determining the next MME. Finally, the 3GPP network needs to inform the mobile terminal about the determined MME identifier for later handover.

In case of 1b and 2c, the MN may need to inform the non-3GPP access about measurement parameters for limiting the radio measurements, then either the non-3GPP access needs to inform the 3GPP network and the mobile terminal about the discovered location information for allowing the determination of the next MME; or the non-3GPP access needs to inform the mobile terminal about the discovered location information. Then, the mobile terminal needs to inform the 3GPP network about the MN's location information as well, so as to allow the 3GPP network to participate in the determination of the next MME.

In case of 1c and 2c, the mobile terminal may need to inform the non-3GPP access about measurement parameters for limiting the radio measurements. Then, the non-3GPP access needs to inform the 3GPP network about the discovered information for allowing it to participate in the determination of the MME.

One aspect regarding the information exchange is that signaling should be avoided if values have not changed. For example, if the PDN-GW of the 3GPP system is informed about a change of the Tracking Area or of a new Care-of Address of the MN and the AAA server in the 3GPP network determines the MME, the PDN-GW does not need to inform the mobile terminal, in case the determined MME remains the same as before.

In addition, in this case it would be further advantageous to avoid as well the signaling between the PDN-GW and the AAA server. According to an embodiment of the first aspect of the invention, the AAA server may inform the PDN-GW about all Tracking Areas or Care-of Address prefixes that are also served by the same MME, i.e. that are equivalent to the current TA or CoA. Thus, already the PDN-GW can decide whether a change of MME might be decided by the AAA server, and thus only signals the Tracking Area (or Care-of address) change to the AAA server, in case it determines that the new Tracking Area/care-of address received from the MN is not served by the same MME.

In the above description it has been described when and between which entities (MN, 3GPP and/or non-3GPP system) specific information needs to be exchanged so as to perform the different steps according to the embodiments of the first aspect of the invention. In the following there will be described how said information may be exchanged. In particular, different variants are described to transfer the various types of information between the mobile terminal and entities in the non-3GPP access and/or 3GPP (core) network. One important principle here is to re-use existing protocols and mechanisms with only minor changes in order to limit the overhead generated by the exchange.

When only the mobile terminal itself determines the MME (case 2a from above), the MN needs to inform the 3GPP core network about the determination. One possibility is to include the MME identifier in the Binding Update messages sent to the PDN-GW of the 3GPP network, e.g. in the Mobility Option Field. This is however only possible when DSMIPv6 is used for mobility management between the 3GPP and non-3GPP systems.

In case of PMIPv6 for inter-system mobility management, the MME identifier needs to be transferred to the MAG before it can be included in a Proxy Binding Update to the PDN-GW. In order to inform the MAG about the MME identifier, username decoration of the NAI (Network Access Identifier) can be used, i.e. the mobile terminal prepends or appends the username with a string including the MME identifier. The NAI is usually transferred during authentication, and in general the mobile terminal has to authenticate with a new MAG. However, if (security) context transfer is used between MAGs, authentication might not be needed, in which case either the mobile terminal must start authentication by its own or it needs to be triggered somehow. Then, the MAG may extract the decorated part of the NAI and use it in the Proxy Binding Update for informing the PDN-GW about the new MME.

Alternatively, the same mechanism, i.e. username decoration of the NAI, can be used differently, i.e. together with the AAA infrastructure for notifying the 3GPP core network about the determined MME. In said case, the decorated NAI is received by the AAA server in the 3GPP core network, and the AAA server can trigger the context establishment at the new MME.

When only the 3GPP core network determines the MME (case 2b from above), the 3GPP core network needs to inform the mobile terminal about the MME identifier. In general, the MME re-assignment comes along with a change of the location of the mobile terminal, i.e. in case of DSMIPv6, the mobile terminal, or in case of PMIPv6, the non-3GPP access (e.g. MAG) may have sent a (Proxy-) Binding Update message to the PDN-GW of the 3GPP system. When receiving the Binding Update, the PDN-GW (respectively a database that is queried by the PDN-GW) may determine the new MME and its identifier. Then, the PDN-GW replies with a (Proxy-) Binding Acknowledge message to the received (Proxy-) Binding Update message. One possible way to convey the MME identifier is to include it in the Mobility Options field of the (Proxy-) Binding Acknowledge message.

In case of DSMIPv6, the mobile terminal can learn the MME identifier directly from the Binding Acknowledgment. However, with PMIPv6 and the received Proxy Binding Acknowledgment message, only the MAG in the non-3GPP access network has the information about the MME identifier. Thus, either the mobile terminal can request the MME identifier from the MAG using for example DHCP, or the MAG informs the mobile terminal in an unsolicited way, for example by appending the EAP request/identity. This is possible because the EAP request/identity may optionally include a displayable message to prompt the peer in case where user interaction is expected. This displayable message can be appended with a NUL character and further options, as for example the MME identifier.

Another possibility instead of using the Mobile IP messages (Binding Updates, Binding Acknowledgments etc), is to use the AAA infrastructure as follows: After the MME identifier is determined by the 3GPP core network, the AAA server triggers authentication of the mobile terminal in the non-3GPP access and includes the MME identifier in a pseudonym or fast re-authentication identity of the EAP-Request/AKA-Challenge or EAP-Request/AKA-Re-authentication message. The mobile terminal can thereby learn the MME identifier from the identity which is to be used for re-authentication in the non-3GPP access. This option will be described later in more detail with reference to FIG. 7.

This just-described mechanism can be used during the normal access authentication in the non-3GPP access. It could also be used in a time-uncritical way with the fast re-authentication procedure and be triggered only for the purpose of informing the mobile terminal about the MME identifier. In other words, re-authentication is triggered at some point in time, after the handover procedure to or within the non-3GPP access is completed.

The above mentioned variants for transmitting and exchanging relevant information between the different entities participating in the steps of the invention can be used to transfer other information as well. The listing below gives a brief overview of the possible procedures and messages that can be used and the kind of additional information that can be transmitted therewith:

Username decoration of the NAI can be used to transfer
    Radio measurement parameters from the mobile terminal to the non-3GPP access to allow efficient radio measurements
    Results of radio measurements or L2 address information from
        the mobile terminal to the non-3GPP access
        the mobile terminal to the core network
        the non-3GPP access to the core network
EAP request/identity can be used to transfer
    Results of radio measurements from the non-3GPP access to the mobile terminal
Binding Update message can be used to transfer
    Results of radio measurements or L2 address information from the mobile terminal to the core network
Proxy Binding Update can be used to transfer
    Results of radio measurements or L2 address information from the non-3GPP access to the core network In the sections above the different possible information that can be used for the MME selection, the various options of mapping the information to an MME and the possibilities for information exchange are described. However, it should be noted, that also combinations of the different options are possible.

One example is a combination of 1a/2a and 1a/2c from the MME determination options described above. The mobile node has a TA-to-MME mapping table with entries for a number of TAs. However, for some TAs the mobile terminal does not have an appropriate entry in the mapping table. In said case, the MN might be informed from the 3GPP network about the appropriate MME, e.g. via AAA signalling.

In addition, the 3GPP network can inform the mobile node about the TA-to-MME mapping for TAs in the neighbourhood of the current TA. If the mobile terminal is moving to one of the neighbouring TAs, it can obtain the appropriate MME from the local mapping table, and signalling from the network is not necessary.

There are trusted and untrusted non-3GPP access networks available depending on the local policy. When the mobile terminal is in a trusted non-3GPP access, it can be connected directly to the PDN-GW of the 3GPP operator using DSMIPv6 or it can be connected with PMIPv6 via a MAG in the non-3GPP access. However, if the mobile terminal is in an untrusted non-3GPP access network, it must first establish a secure tunnel using e.g. IKE/IPsec to an ePDG (evolved Packet Data Gateway) in the 3GPP core network before a connection to the 3GPP operator's services can be established. When DSMIPv6 is used by an untrusted non-3GPP access, the ePDG allocates the CoA to the mobile terminal, and when PMIPv6 is used, the ePDG acts as MAG.

In case the mobile terminal is in an untrusted non-3GPP access and the CoA is used to determine the location of the mobile terminal, the location information is rather inaccurate, because the ePDG allocates the CoA and not the non-3GPP access. Here, instead of the CoA from the ePDG, the local IP address assigned in the non-3GPP access network that is used by the mobile terminal to establish the tunnel to the ePDG can be used to determine the location. In case of DSMIPv6, the mobile terminal may include additionally the local IP address in the Binding Update to the PDN-GW, or in case of PMIPv6, the ePDG may include the mobile terminal's local IP address in the Proxy Binding Update.

If on the other hand 3GPP measurements are used for location determination, one alternative in the untrusted non-3GPP access network scenario would be to report the measurement results by the mobile terminal using enhanced IKE/MOBIKE messages, e.g. using the configuration payload message.

In the following description there will be presented some specific embodiments of the invention relating to the first aspect of the invention, in which some of the previously described options and variants are implemented.

Figure 3:
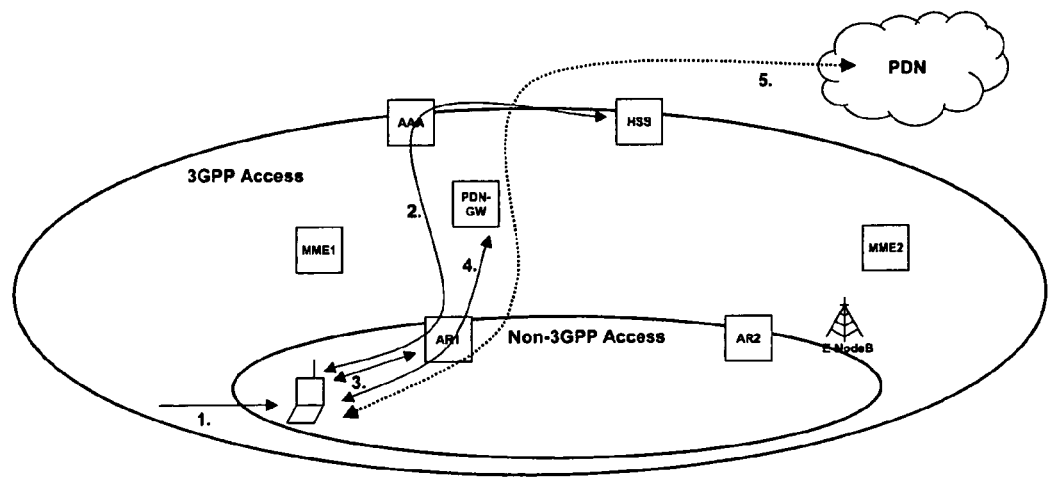
FIG. 3 illustrates the network deployment of a non-3GPP and 3GPP network and the steps for a handover procedure from the 3GPP network to the non-3GPP network.
Figure 4:
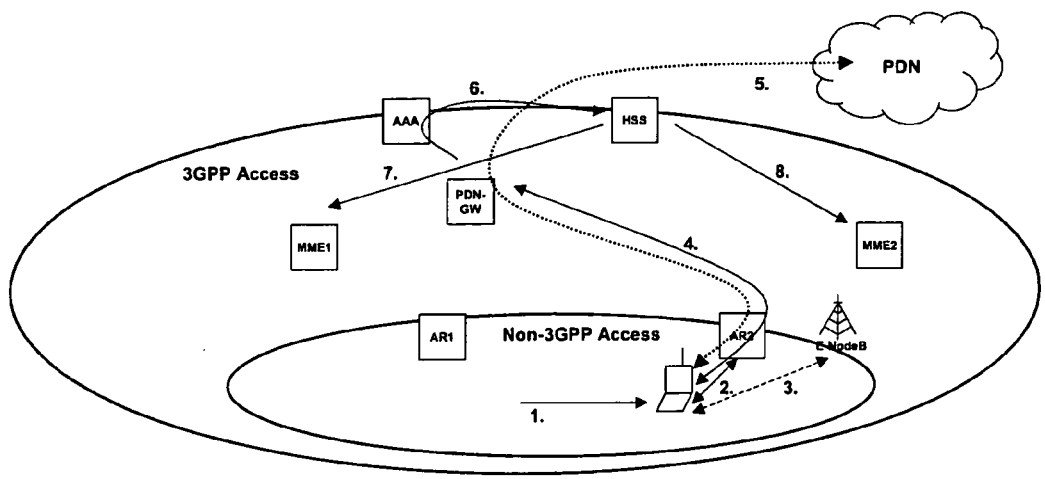
FIG. 4 illustrates the network deployment of FIG. 3 and the steps for a handover of the MN within the non-3GPP network according to an embodiment of the first aspect of the invention.
Figure 5:
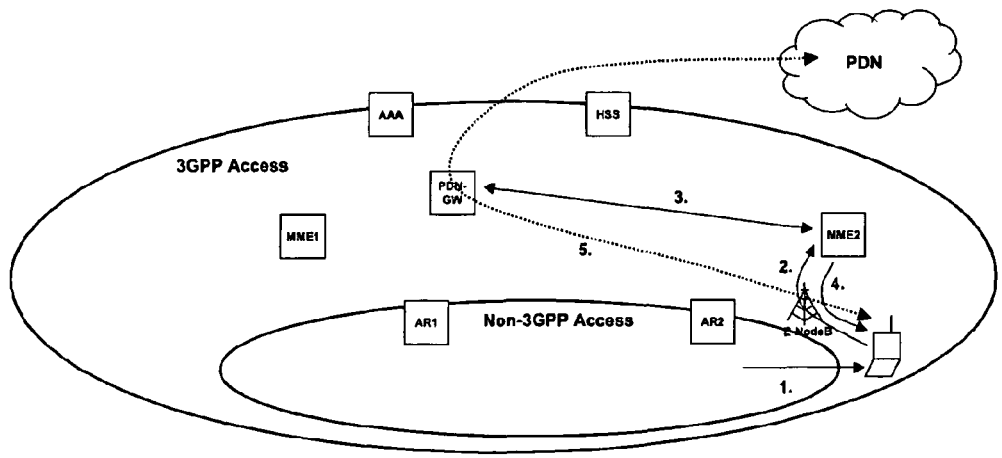
FIG. 5 illustrates the network deployment of FIGS. 3 and 4 and the steps for a handover of the MN from the non-3GPP network to the 3GPP network according to the embodiment of the first aspect of the invention.

FIGS. 3 to 5 pertain to a first exemplary embodiment, in which a MN is first attached in the 3GPP network and being registered in a first MME1. The MN then moves to the non-3GPP network before re-attaching back to the 3GPP network. The figures illustrate the network deployment and the current location of the MN. Each figure further has arrows which show the relevant procedural steps performed in the network.

In this exemplary embodiment of FIGS. 3 to 5, it is assumed that the mobile node performs 3GPP measurements for determining its own location. Furthermore, the MN also decides on whether a new MME is necessary and further determines a new MME in the corresponding 3GPP network next to its own location in the non-3GPP network. The core network (PDN-GW) is informed about the new MME with a Binding Update message. The HSS then registers the MN in the new MME.

FIG. 3 illustrates the attach procedure for a handover from the 3GPP network to the non-3GPP network when using DSMIPv6. As illustrated by arrows in FIG. 3, the following steps are performed:

1. The mobile node was attached to MME1 in the 3GPP access and hands over to the non-3GPP Access.
2. The mobile terminal performs Access Authentication and Authorization in the non-3GPP Access via the AAA server and the HSS of the 3GPP system. The AAA server in the 3GPP network authenticates the mobile node.
3. The mobile terminal performs L3 Attach & Local IP Address Allocation with Access Router AR1 in the non-3GPP access.
4. The mobile terminal sends a DSMIPv6 Binding Update to the PDN-GW and receives a Binding Acknowledge from the PDN-GW.
5. The user data flow to/from the UE is re-routed via the Access Router AR1 in the non-3GPP access network.

FIG. 4 shows the steps when the MN moves within the non-3GPP network and thus also conducts some steps according to the embodiment of the invention.

1. The MN hands over within the non-3GPP Access to another Access Router AR2.
2. The mobile node performs L3 Attach & Local IP Address Allocation with the new Access Router AR2.
3. The mobile terminal measures the 3GPP radio access, respectively the radio signals referring to the nearest eNodeB. The MN infers its current location from the radio measurements on the 3GPP network and decides that the old MME can no longer be used at the determined location of the MN. Based on the inferred location, a new MME2 is determined.
4. The mobile node sends a DSMIPv6 Binding Update message (including information about the determined MME 2, e.g. MME2 identifier) to the PDN-GW in the 3GPP network and receives a Binding Acknowledgement.
5. The user data flow to/from the mobile node is re-routed via the new Access Router AR2 in the non-3GPP access.
6. The PDN-GW notifies the HSS about the new MME2 for the mobile node.
7. The HSS requests the old MME1 to delete the contexts for the mobile node.
8. The HSS pushes the contexts for the mobile node to the new MME2.

As apparent, the above steps 3, 4, 6-8 are performed in order to prepare the actual handover of the MN to the 3GPP network, by relocating the MN's MME from the old MME1 to a new MME2, according to one embodiment of the invention with regard to the first aspect of the invention.

FIG. 5 then shows the steps necessary to perform the actual handover from the non-3GPP network to the 3GPP network.
1. The mobile node was attached to the Access Router AR2 in the non-3GPP access and hands over to the eNodeB in the 3GPP Access.
2. The mobile node sends an Attach Request message to the eNodeB. The identifier used in the Attach Request (i.e. the GUTI) has a component that identifies the MME2. The eNodeB then forwards the Attach Request to the identified MME2. The authentication of the MN in the MME2 though needed, is omitted from FIG. 5.
3. The MME2 creates the bearers towards the PDN-GW.
4. The MME2 establishes the radio bearers with the mobile node.
5. The user data flow to/from the mobile node is re-routed via the 3GPP access.

Figure 2:
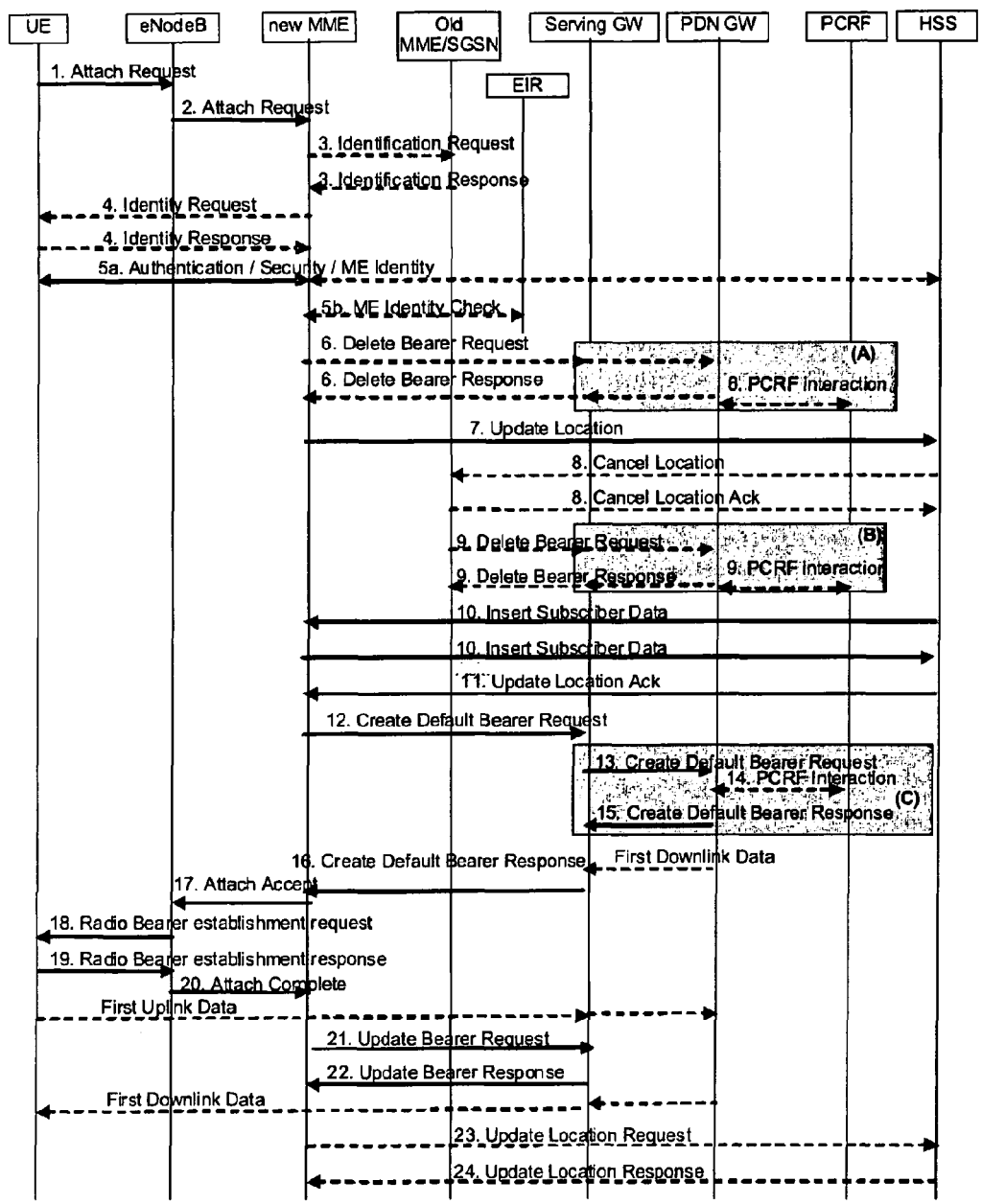
FIG. 2 is a signaling diagram for an E-UTRAN Initial Attach Procedure.
Figure 6:
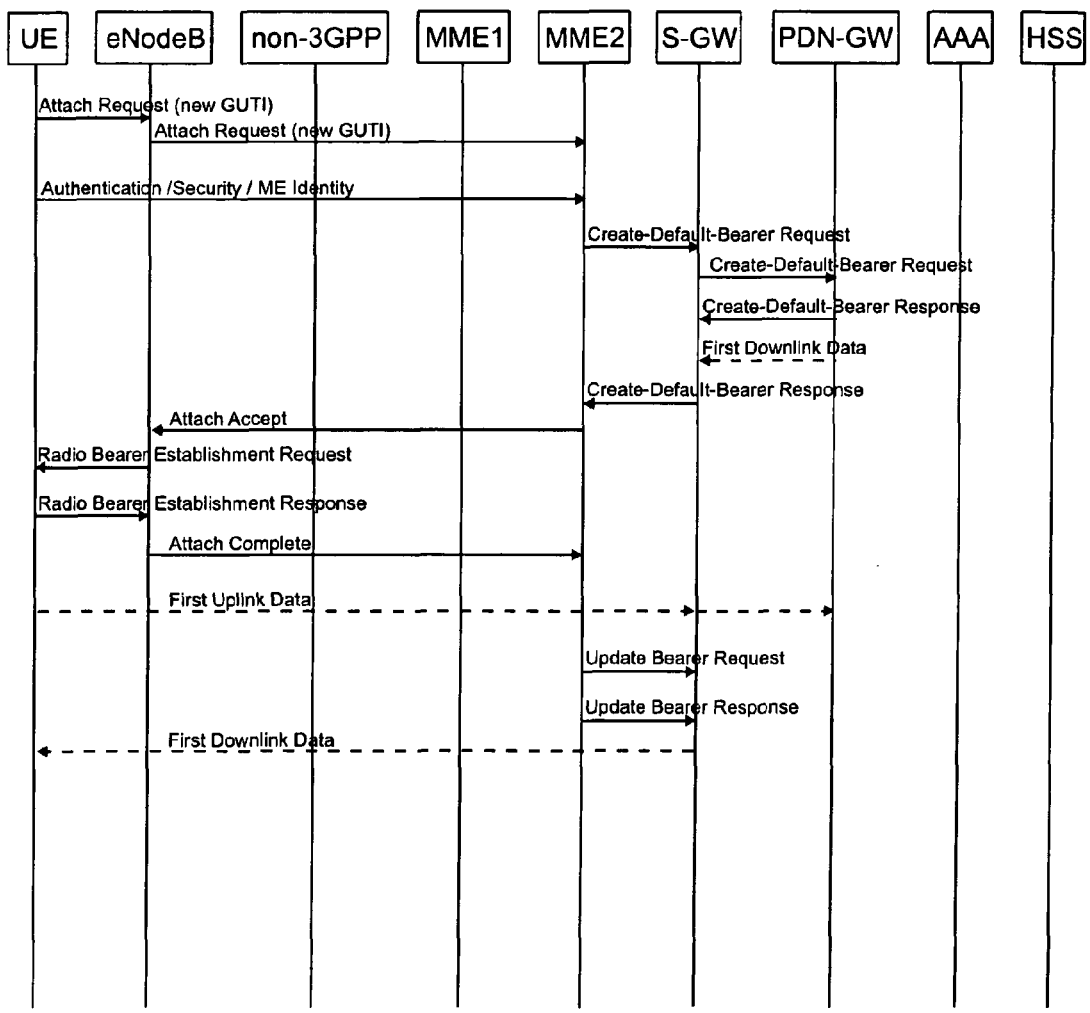
FIG. 6 is a signaling diagram for a handover procedure from the non-3GPP network to the 3GPP network according to another embodiment of the first aspect of the invention.

FIG. 6 is a signaling diagram also illustrating the actual handover procedure according to FIG. 5. FIG. 6 also allows a direct comparison with the handover procedure of the prior art as shown in FIG. 2. As apparent, a couple of steps could be eliminated by the improved handover procedure according to the embodiments of the invention relating to the first aspect, namely when considering the above-used scenario, steps 3, 7, 8, 10 and 11 of the procedure illustrated in FIG. 2. Steps 4, 6 and 9 are not necessary due to the chosen scenario in which, firstly, the old MME still maintains relevant context of the MN, secondly, the MN was not previously attached to the new MME, and, finally, the bearers for the old MME have been properly deleted when handing over to the non-3GPP network (though omitted from FIG. 3).

According to the above-presented exemplary embodiment of the invention, the actual handover procedure (FIG. 5 and FIG. 6) is facilitated since an appropriate new MME has been already discovered and properly provided with the contexts of the MN at the time of its handover. This reduces the time necessary to perform the handover, thus eliminating or mitigating any delays stemming from the necessary MME relocation during the handover procedure.

Another embodiment of the invention will be illustrated with reference to FIG. 7. In this embodiment, it is assumed that the MN is active in the non-3GPP access network, and states are established at a previous MME1. The MN is moving in the non-3GPP access network and changes its point of attachment to another Access Router. The mobile node performs 3GPP measurements to determine its location, and informs the PDN-GW of the 3GPP system about its determined location and/or the results of the radio measurements in the Binding Update. The PDN-GW forwards the received information to the AAA server in the 3GPP core network that determines the appropriate MME 2. The mobile terminal is informed about the MME 2 during the re-authentication procedure.

1. The mobile terminal has moved in the non-3GPP access, changed the Access Router and thus performs a Binding Update towards the PDN-GW of the 3GPP network. In the Binding Update message the mobile terminal includes the results of recently performed radio measurements (e.g. the discovered Tracking Area). The PDN-GW sends a Binding Acknowledgment back to the mobile node.
2. In order to check whether a new MME is necessary, the PDN-GW may check whether the new Tracking Area is in the list of equivalent Tracking Areas, i.e. whether it is served by the same or a different MME. No action is required, if the new TA is served by the same MME1.
3. If the TA is not in the list of the equivalent TAs, i.e. the new TA is not served by the same MME, thus the PDN-GW registers the new TA with the AAA server.
4. The AAA has access to a database where the relationship between Tracking Areas and MMEs is stored. The AAA server requests the database and determines the new MME and also all equivalent Tracking Areas.
5. If the AAA server is not updated with changes of the mobile terminal's context automatically from the HSS, the AAA server requests the context information, e.g. fresh authentication vectors for the MN, from the HSS.
6. The AAA server triggers the new MME2 to create a context for the mobile terminal. This request may comprise resource setup in other entities, e.g. setup of radio bearers in the Radio Access Network or setup of bearers in the S-GW.
7. The new MME2 sends an Update Location to the HSS, to inform the HSS that the mobile terminal is now served by the MME2.
8. The HSS sends a trigger to the old MME1 to delete the context for the mobile terminal.
9. The new MME2 may allocate a new temporary identity (TMSI) for the mobile terminal, that uniquely identifies the mobile terminal in the MME2, and may inform the AAA server about it.
10. The AAA server informs the PDN-GW about the list of equivalent TAs.
11. In order to inform the mobile terminal about the change of the MME, the AAA server starts the re-authentication procedure, i.e. it sends a re-authentication trigger to the non-3GPP access, that is for example the AP or AR currently serving the MN.
12. The non-3GPP access requests the mobile terminal to re-authenticate using EAP.
13. The mobile terminal starts authentication and provides its identity to the non-3GPP access.
14. The non-3GPP access forwards the authentication message from the mobile terminal to the AAA server in the 3GPP core network.
15. The AAA server starts EAP-AKA re-authentication, and during the AKA procedure the AAA server includes in the EAP-Request/AKA-Reauthentication message in the "AT_NEXT_REAUTH_ID" attribute a new re-authentication ID. The re-authentication ID points to the new MME2 and may point to the new allocated TMSI.
16. The non-3GPP access forwards the EAP-Request to the mobile terminal.
17. The mobile terminal learns the new MME2 and new TMSI from the re-authentication ID in the EAP-Request/AKA-Reauthentication message and sends the EAP-Response/AKA-Reauthentication message to the non-3GPP access.
18. The non-3GPP access forwards the EAP-Response to the AAA server.
19. The AAA server informs the non-3GPP access that the EAP authentication is successful.
20. The non-3GPP forwards the EAP-success to the mobile terminal.
21. At some point in time, while being connected to the non-3GPP access network, the mobile terminal decides to handover to the 3GPP access network.
22. The mobile terminal constructs the Global Unique Temporary Identifier (GUTI) using the MME2 identifier and TMSI from the re-authentication ID.
23. The mobile terminal sends the Attach Request to the eNodeB including the constructed GUTI.
24. The eNodeB detects the appropriate MME from the GUTI and forwards the Attach Request to the MME2 that has the context for the mobile terminal.

The remaining steps for performing the handover coincide with those already discussed with reference to FIGS. 5 and 6.

Figure 7:
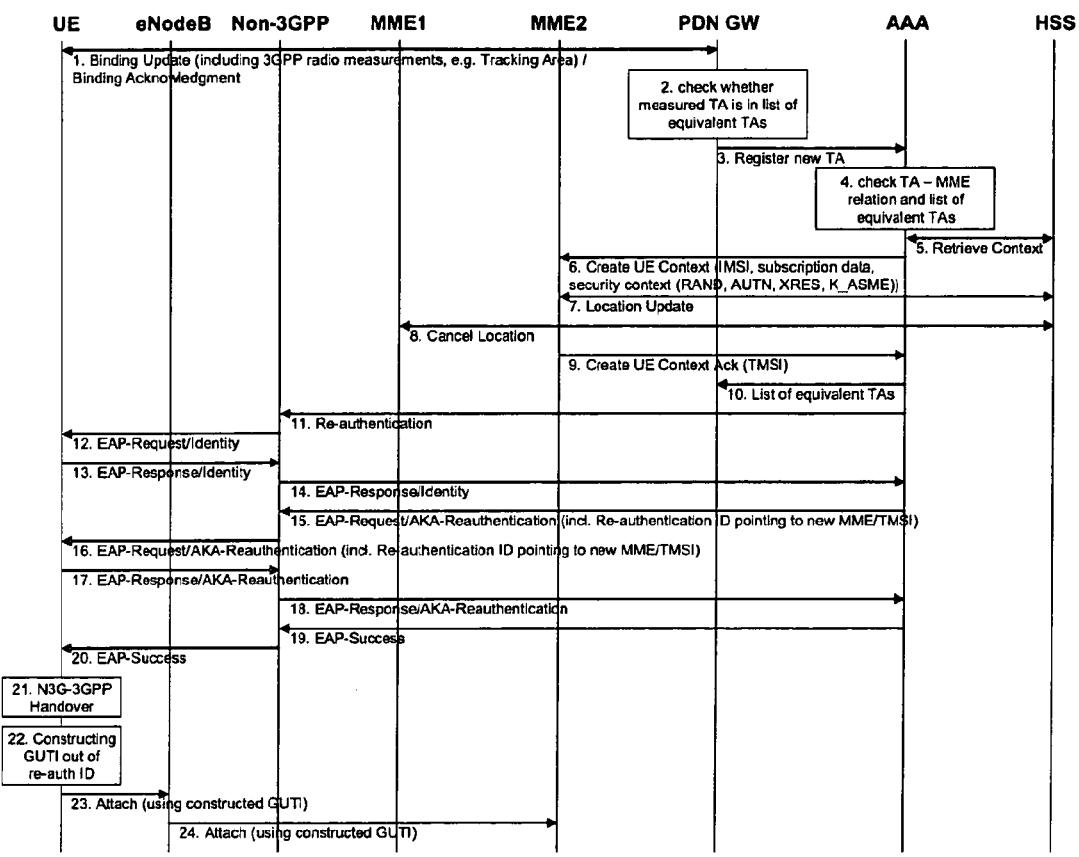
FIG. 7 is a signaling diagram for a handover within the non-3GPP network according to an embodiment of the first aspect of the invention using AAA signaling for informing the UE about the determined new MME.

As apparent from the above embodiment of FIG. 7, the AAA re-authentication procedure is implemented in order to inform the MN about the selected new MME2. Thereby an existing procedure is used, and there is no need to define a new message for the purpose of transmitting the identity of the new MME2 to the MN. The re-authentication procedure comprises the steps 11 to 20 of FIG. 7.

In the following, further embodiments of the first aspect of the invention refer to a different handover procedure that is further enhanced by the principles of the invention. Different optimizations for mobility between 3GPP accesses and non-3GPP accesses exist which establish 3GPP access contexts in the 3GPP system or allow a pre-attachment and/or pre-authentication of the mobile terminal with the 3GPP system before the actual handover. To support this, e.g. a Layer2 tunnelling interface between the non-3GPP access and the MME, and transparent tunnelling from the mobile terminal to the MME can be used, or alternatively a Layer3 tunnelling mechanism from the mobile terminal over the non-3GPP access network to an (emulated) eNodeB or MME in the 3GPP core network.

In case of handovers from a non-3GPP access to a 3GPP access with L2/L3 tunnelling, the procedure is usually divided into 2 phases, a first pre-registration phase and a second handover phase. In the pre-registration phase, the mobile terminal can attach and perform service activation over the L2/L3 tunnel before leaving the non-3GPP access. In the handover phase the handover signalling may also be performed over the tunnelling interface.

In case of handovers which use L2/L3 tunnelling for pre-registration, the mobile terminal may perform the 3GPP Attach procedure (pre-registration) with an MME via the non-3GPP access network just before the handover to the 3GPP access. For this kind of handover, the trigger to do the pre-registration might be based for example on mobile terminal measurements of the 3GPP access. Furthermore, there might be no MME assigned to the mobile terminal before the optimized handover procedure is initiated. Thus, in some cases MME relocation might not required here.

However, there are several problems with the handover procedure as just mentioned using L2/L3 tunneling. For one thing, it is not clear when to start with the handover procedure, i.e. when to start with the 3GPP measurements for triggering the handover.

Further, when the mobile terminal performs the pre-registration procedure via a L2 tunnel from the non-3GPP access, the pre-registration messages (e.g. Attach and Service Request) from the mobile terminal must be routed to an MME in the 3GPP core network. Thus, another issue in this optimized handover case is the MME determination. One possibility is that the L2 tunnel between the non-3GPP access and the MME is statically preconfigured, such that always the tunnel endpoint in the non-3GPP access is connected to a close MME in the 3GPP core network. However, this requires a lot of manual configuration and management effort in the non-3GPP access network. Another possibility is that always the same MME is used for all pre-registrations and the MME is relocated later. However, this may add additional delay during the handover procedure.

In order to further optimize the handover procedures using L2/L3 tunnelling, the principles of the previous embodiments of the invention for the first aspect may also be applied in this scenario.

Figure 8:
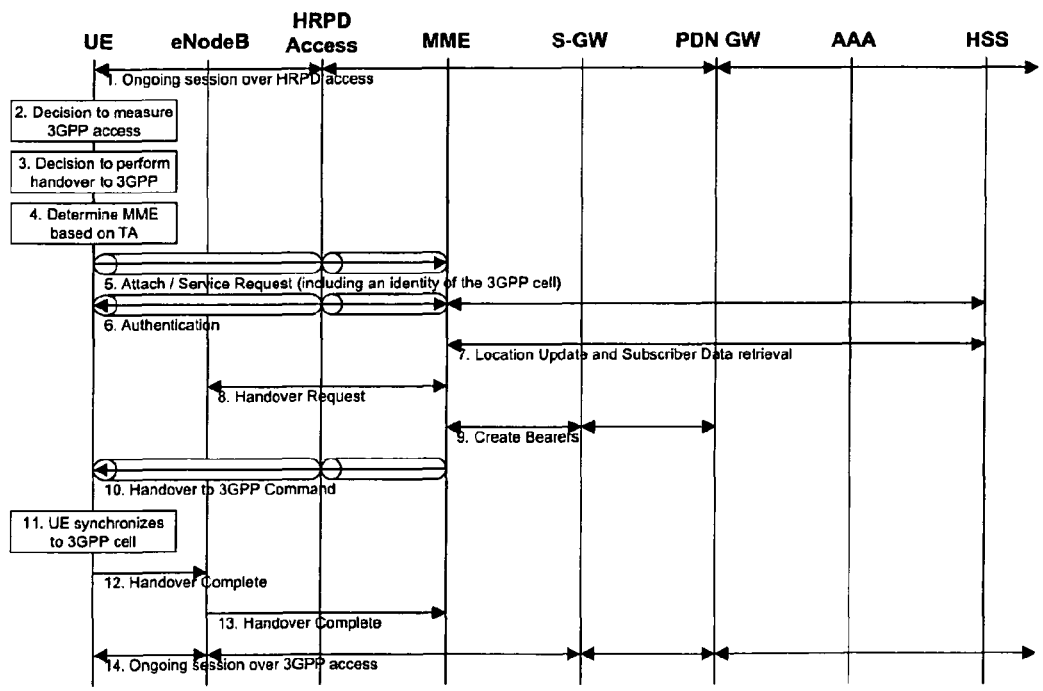
FIG. 8 shows an optimized HRPD-3GPP handover with 3GPP measurement decision and MME determination according to another embodiment of the first aspect of the invention.

The procedure in FIG. 8 shows an optimized HRPD (High Rate Packet Data)—3GPP handover with 3GPP measurement decision and MME determination according to another embodiment of the invention.
1. An ongoing session is established over the HRPD access.
2. The mobile terminal decides based on a trigger (e.g. decreasing non-3GPP access base station signal strength or low number of reachable non-3GPP access base stations) to start 3GPP radio measurements.
3. Based on the results of the 3GPP measurements (i.e. the inferred MN's location or TAs), the mobile terminal decides to pre-register and handover to the 3GPP access.
4. The mobile terminal determines an MME out of the 3GPP measurements results, e.g. based on a mapping of Tracking Areas to MMEs.
5. The mobile terminal sends an Attach and Service Request message over the L2 tunnel to the determined MME. In the Attach message the mobile terminal indicates the to be used MME and additionally an identifier of the 3GPP cell or eNodeB is included in order to enable the MME to setup resources at the eNodeB in advance.
6. Authentication of the MN is performed with the HSS.
7. The MME sends an Update Location message to the HSS and fetches user subscription data of the MN. In this step the HSS shall also return the address of the already assigned PDN-GW.
8. The MME sends a Handover Request message to the eNodeB. This message creates the UE context in the eNodeB, including information about the bearers, and the security context.
9. The MME sends a Create Bearer Request message to the selected S-GW. The S-GW creates an entry in its bearer table and sends a Create Bearer Request message to the PDN-GW.
10. At the end of the Attach and Service Request procedure, the MME sends a Handover Command over the L2 tunnel to the mobile terminal.
11. The mobile terminal synchronises with the target 3GPP cell.
12. The mobile terminal sends a Handover Complete message to the eNodeB.
13. The eNodeB sends a Handover Complete message to the MME.
14. The uplink and downlink data are sent now from/to the mobile terminal over the 3GPP access.

In the above procedure it is possible to easily trigger the radio measurements only when the likelihood for a handover increases (in this case, based on the radio signal strength), thereby optimizing the radio resource management. Further, an appropriate MME can be discovered by using the radio measurements performed and the inferred MN's location.

In the following there will be presented embodiment of the second aspect of the invention relating to different scenarios than considered in the previous description. The embodiments relating to the second aspect below however shall not be understood as limiting the scope of the invention, but shall be taken as a guide for a skilled person on how to apply the invention. Consequently, other embodiments of the invention will become obvious to the skilled person when studying the exemplary embodiments below.

The above architecture describes the non-roaming variant, i.e. the non-3GPP access, the mobile terminal is connected to, has a direct roaming relationship with the home operator of the mobile terminal.

However, if the non-3GPP access does not have direct roaming relationship with the home operator, a possible variant for the mobile terminal to connect to a PDN-GW in the Home Public Land Mobile Network (HPLMN) is to use a Serving Gateway (S-GW) in a Visited Public Land Mobile Network (VPLMN) as an intermediary between the MAG in the non-3GPP access network and the PDN-GW. Such a connection is called "Chained connection" or "Chaining". In the Chaining case, the AAA Proxy selects the S-GW in the VPLMN and notifies the MAG in the non-3GPP access about it.

In case of a handover of the mobile terminal from the non-3GPP access Chaining case to the 3GPP access network, the previously used S-GW might also need to be relocated. As this S-GW relocation is performed by the MME, the selected S-GW for the 3GPP access network could be different from the former S-GW that was selected by the AAA Proxy and used from the non-3GPP access network. This is associated to the above-described second problem of the prior art underlying the present invention.

According to another principle of the second aspect of the invention, in case of a handover from the non-3GPP access to the 3GPP access with the Chaining, a new S-GW to be used in 3GPP access is selected by the MME before the handover, and the S-GW establishes the relevant context related to the mobile terminal, such as a Binding Update List (BUL) entry for PMIPv6, based on information transferred from the old S-GW in advance to the handover.

With regard to S-GW relocation in Chaining case, one important point is that the entity that selects the S-GW is different depending on the access network the mobile terminal is attached to, i.e. the AAA proxy for non-3GPP access networks and the MME for 3GPP access networks. Therefore, the relocation when the mobile terminal is attached to a non-3GPP access network needs to be performed by the MME via the AAA Proxy.

In the Chaining case, after the MME close to the mobile terminal has been determined (according to the previous embodiments of the invention), the appropriate S-GW is selected by this determined MME. One way to select the S-GW is to have a database with entries of S-GWs which are statically allocated to each area or coverage, e.g. groups of Tracking Areas or eNodeBs etc. Also dynamic information can be used for the selection, e.g. processing load of S-GWs, failure of S-GWs etc. Once the S-GW (a new S-GW) is determined the user data path for the mobile node is changed from via the old S-GW to via the new S-GW.

However, if S-GW relocation is not allowed by any reason, such as operator's policy, the MME selects the currently used S-GW, which was selected before by the AAA proxy during attach or handover of the mobile terminal to the non-3GPP access network. In this case, the MME obtains the current S-GW information from the AAA Proxy.

In case that PMIP protocol is applied between the PDN-GW and the S-GW, after or during the S-GW relation is performed, specific information for attachment of the mobile terminal to the new S-GW, e.g. Binding Update List (BUL) entry for the mobile terminal and the PDN-GW address etc. may be transferred from the MAG in the non-3GPP access to the new S-GW which is possibly a new MAG for the mobile terminal after handover The PDN-GW address may be included in the BUL entry as the Home Agent address. Alternatively, the PDN-GW address may be obtained from other network entities such as HSS via AAA server and AAA Proxy. Furthermore, the information may include QoS information for dedicated bearer establishment. A trigger to transfer the information can be issued to the MAG by the mobile terminal or the MME during the procedure described in the embodiments of the second aspect of this invention. However, it can be done by the determined MME, the new S-GW, the PDN-GW or the AAA Proxy as well.

The new S-GW starts the setup of the context based on the information obtained prior to the mobile terminal's attachment. In detail, the new S-GW constructs a BUL entry for the mobile terminal and also may create a tunnel with the PDN-GW the UE is connected to.

If the S-GW creates the tunnel to the PDN-GW, the S-GW may need to notify the PDN-GW not to transfer any packets related to the mobile terminal to the new S-GW until the mobile terminal hands over to the 3GPP access network.

The mobile terminal may be notified that the context setup in the S-GW has been done. Then, the mobile terminal may delay the handover to the 3GPP access until it is triggered with the notification. This helps avoiding occurrence of packet losses during handover to 3GPP in parallel with the S-GW relocation.

Even when the S-GW relocation doesn't happen, it is effective for seamless handover to transfer the relevant information or the context to the mobile terminal. In this case, as the existing PMIP tunnel to the PDN-GW for the current mobile terminal can be continuously used, the S-GW only requests the PDN-GW to start transferring packets destined to the mobile terminal without creating relevant BUL entry and tunnel for the mobile terminal at the handover. PBU may be used as the request.

In case that GTP is applied between the S-GW and the PDN-GW, less or no information may be transferred from the MAG to the new S-GW than the case of PMIPv6 applied between them. When the MME or the mobile terminal knows the GTP is applied, they may not trigger the MAG to transfer the information. One way to know if the GTP is performed is to check if the information, i.e. TEID Address of s-GW etc, is existing in the storage of the MME, the S-GW, the PDN-GW and/or so on.

After the new MME is selected, the mobile terminal may ask the MME, e.g. via AAA Proxy/Server, MAG, PDN-GW etc., about the possible link MTU (Maximum Transmission Unit) size to be used in the 3GPP access after handover. By this, if there are one or more TCP sessions from/to the mobile terminal, it can prepare and may start to change the flow control parameter of TCP, and also can pre-configure the IP packet buffer for the notified link MTU size in advance to the handover.

As already mentioned, the S-GW relocation could be performed at the handover from 3GPP to non-3GPP access network as well. In this case, when the mobile terminal triggers the MME that a handover to non-3GPP access may occur, the MME obtains a new S-GW address from the AAA Proxy in the 3GPP access network or asks the AAA Proxy to assign the current S-GW to the mobile terminal in case of attaching to the non-3GPP access network. Then, the information for the mobile terminal's attachment is to be transferred between the S-GWs.

In the following and with reference to FIG. 9, a procedure for one of the described options above is shown for the handover between 3GPP access and trusted non-3GPP access with the S-GW relocation in the Chaining case. In this exemplary scenario it is assumed that the mobile terminal performs 3GPP measurements, the mobile terminal determines an MME based on the measurements and informs the MAG in non-3GPP access network about the MME using NAI decoration, and that the MAG informs the core network about it with the Proxy Binding Update message via S-GW. In this procedure, it is assumed that PMIPv6 is applied between the S-GW and the PDN-GW.

The following steps are performed when a mobile terminal hands over from 3GPP access to non-3GPP access:

1. The mobile terminal was attached to MME1 in the 3GPP access network and hands over to the trusted non-3GPP access.
2. The mobile terminal attaches to the non-3GPP access network, i.e. to the MAG1 and performs Access Authentication and Authorization in the non-3GPP Access via MAG1 and AAA Proxy in the 3GPP VPLMN (Visitor Public Land Mobile Network). The 3GPP AAA server in the 3GPP HPLMN (Home Public Land Mobile Network) authenticates the mobile terminal. During authentication the AAA Proxy may obtain the S-GW address which was used by the mobile terminal in the 3GPP access network from MME1 in order to reduce handover time caused by S-GW selection. Furthermore, when no user data flow to/from the mobile terminal is seen for a determined time, the AAA Proxy may be triggered and performs relocation to a different S-GW selected solely by the AAA Proxy even when the AAA Proxy obtains the S-GW address from the MME
3. The MAG1 sends a Proxy Binding Update (PBU) message to the PDN-GW via a S-GW1 which is allocated by the AAA Proxy and receives a Proxy Binding Acknowledge (PBA) message.
4. The MAG1 notifies the mobile terminal of a network prefix or an IP address assigned by the PDN-GW. The mobile terminal completes L3 Attach in the non-3GPP access network.
5. The user data flow is re-routed to/from mobile terminal attached to the MAG1 in the non-3GPP access.

Figure 10:
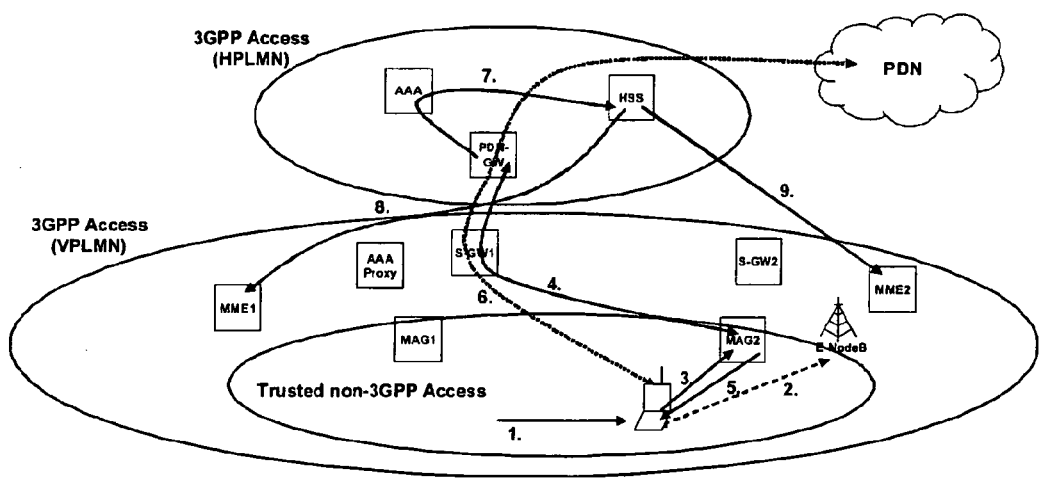
FIG. 10 illustrates an MME re-assignment Procedure for an Intra trusted non-3GPP handover of the mobile node according to another embodiment of the second aspect of the invention.

With reference to FIG. 10, the following steps are performed when a mobile terminal moves within the non-3GPP access according to this embodiment of the invention:

1. The mobile terminal hands over within the non-3GPP Access.
2. When the mobile terminal finds a new MAG (MAG2), the mobile terminal measures the 3GPP radio access and determines an MME2 based on the 3GPP measurements.
3. The mobile terminal attaches to the non-3GPP access network, i.e. authenticates towards the MAG2 with its decorated NAI including information about the determined MME2. In case the mobile terminal knows that Chaining is applied, it may also request not to perform the S-GW relocation now, in order to avoid disruption of ongoing sessions. The request is transferred to the MME2, e.g. via the HSS, and the MME2 decides not to perform the S-GW relocation procedure after step 10 in FIG. 11 (will be explained later). In this case, the mobile terminal may request from the MAG2 to perform the S-GW relocation after a part or all of the sessions terminate or request the MME2 to perform the S-GW relocation during the handover procedure to the 3GPP access.
4. The MAG2 sends a PBU message including the mobile terminal's decorated NAI containing information about the determined MME 2 to the PDN-GW via S-GW1 which could be the same as the one allocated by the AAA Proxy and used before, and receives a PBA message. The decorated NAI can be alternatively notified to the AAA Server by the S-GW1 via the AAA Proxy. In such case, the AAA Proxy notifies the HSS about the MME2 for the mobile terminal based on the information contained in the decorated NAI at step 7 instead of the PDN-GW.
5. The MAG2 notifies the mobile terminal of a network prefix or an IP address assigned by the PDN-GW. The mobile terminal completes L3 Attach in the non-3GPP access network.
6. The user data flow is re-routed to/from mobile terminal attached to the MAG2 in the non-3GPP access.
7. The PDN-GW notifies the HSS about the new MME2 for the mobile terminal.
8. The HSS requests the old MME1 to delete the context for the mobile terminal.
9. The HSS pushes context for the mobile terminal to the new MME2. After completion of pushing the context to the MME2, the HSS may notify the mobile terminal of the completed MME relocation. The notification can be routed via the AAA Server, the PDN-GW, the S-GW and MAG2, or via the AAA Server, the AAA Proxy and the MAG2, to the mobile terminal. If the S-GW relocation is performed, the notification can be postponed until the S-GW relocation is done, i.e. step 12 in FIG. 11.

Figure 11:
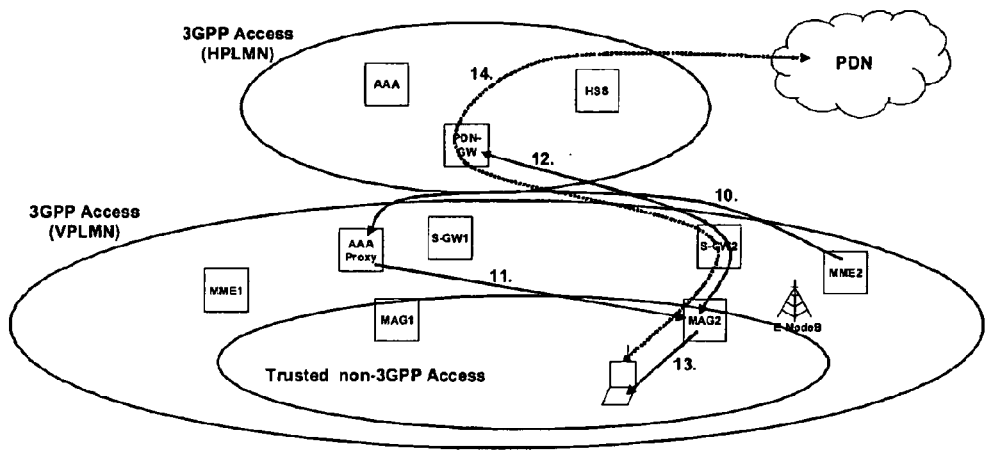
FIG. 11 shows an S-GW re-assignment Procedure for Infra trusted non-3GPP handover according to the embodiment of the second aspect of the invention.

With reference to FIG. 11, the following steps are performed after MME relocation (re-assignment) when a mobile terminal moves within the non-3GPP access according to this embodiment of the second aspect of the invention:

10. If the MME2 knows that Chaining is applied or if the MME2 is indicated to perform the S-GW relocation by the HSS, the MME2 requests the AAA Proxy to perform the S-GW relocation from S-GW1 to S-GW2 which has been selected by the MME2. The MME2 can find out that Chaining is applied by asking the AAA Proxy or the HSS via the AAA Proxy and the AAA Server. In the case that the GTP is applied between the S-GW and the PDN-GW, the MME2 may issue no trigger to the AAA proxy even if the Chaining is applied.
11. The AAA Proxy notifies the MAG2 of the S-GW2 address and requests to switch to the S-GW2, and also notifies both or either of the S-GW1 and the S-GW2 to start transferring relevant information from S-GW1 to S-GW2. In this case, while sessions still being active in the route via S-GW1, in order to avoid interruption of ongoing sessions, data forwarding from the old S-GW1 to the new S-GW2 can be used.
12. The MAG2 sends a PBU message to the PDN-GW via a S-GW2 and receives a PBA message. After the new connection is established with the new S-GW2, the PDN-GW may notify the HSS of the completion of connection establishment via the AAA Server. Then, the HSS may notify the mobile terminal of the completed S-GW relocation, so that the mobile terminal is aware of the successful S-GW relocation in the core network. The notification can be routed via the AAA Server, the PDN-GW, the S-GW and MAG2, or via the AAA Server, the AAA Proxy and the MAG2, to the mobile terminal.

13. The MAG2 notifies the mobile terminal of a network prefix or an IP address assigned by the PDN-GW. The mobile terminal completes L3 Attach in the non-3GPP access network.
14. The user data flow is re-routed to/from mobile terminal attached to the MAG2 in the non-3GPP access.

Figure 12:
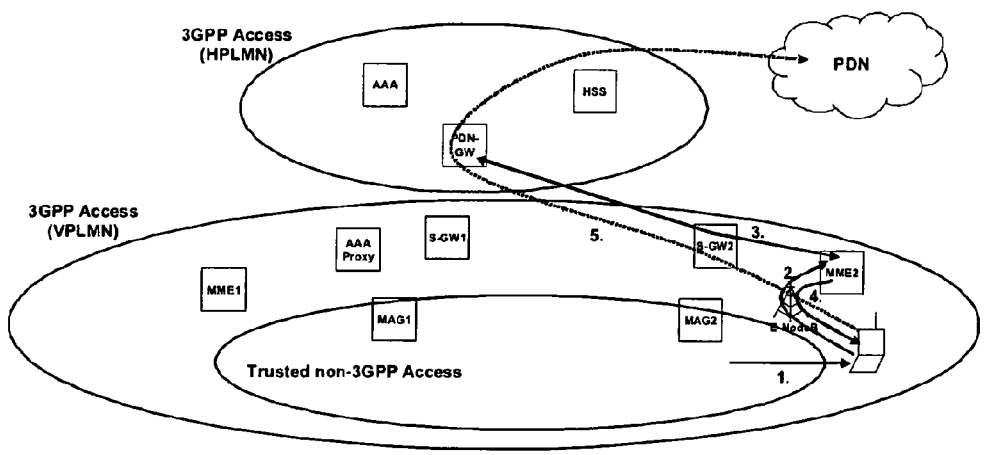
FIG. 12 shows an Attach procedure for a handover from a trusted non-3GPP network to a 3GPP network according to an embodiment of the second aspect of the invention.

Subsequently, the following steps as illustrated in FIG. 12 are performed when a mobile terminal hands over from a non-3GPP access to a 3GPP access network:

1. The mobile terminal was attached to the MAG2 in the non-3GPP access and hands over to the 3GPP Access.
2. The mobile terminal sends an Attach Request message to the eNodeB. The identifier used in the Attach Request (i.e. the GUTI) has a component that identifies the MME2. The eNodeB forwards the Attach Request to the MME2. The mobile terminal may add a flag which indicates not to re-select the MME and to use the MME of the identifier contained in the GUTI, i.e. MME2. Furthermore, if the mobile terminal knows the S-GW relocation was performed during the MME relocation procedure, the mobile terminal also indicates not to re-select the S-GW and use the current S-GW2.
3. The MME2 creates the bearers towards the PDN-GW via the S-GW2, already selected. The S-GW2 setup PMIPv6 MAG configuration using the prepared context, i.e. BUL and tunnel with PDN-GW for the mobile terminal.
4. The MME2 establishes the radio bearers with the mobile terminal.
5. The user data flow is re-routed to/from the mobile terminal attached to the 3GPP access. In case of the S-GW relocation, while still being active in non-3GPP, in order to avoid interruption of ongoing sessions, data forwarding from the old S-GW to the new S-GW can be used.

In this following description a procedure for one of the described options above will be described according to a further embodiment of the invention. In particular, a mobile node performs the handover between a 3GPP access and a trusted non-3GPP access with the S-GW relocation in the Chaining case. In this exemplary scenario it is assumed that the mobile terminal performs 3GPP measurements, the mobile terminal determines an MME based on the measurements and informs the MAG about the MME using NAI decoration on the AAA infrastructure, and the MAG informs the core network via the AAA Proxy with AAA basis. In this procedure, it is assumed that PMIPv6 is applied between the S-GW and the PDN-GW.

Figure 9:
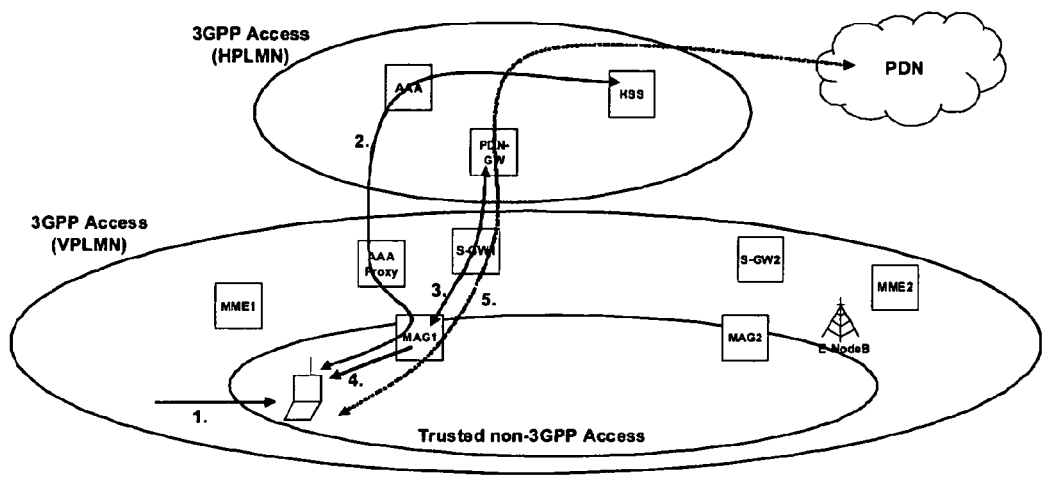
FIG. 9 shows an Attach procedure for handover of a mobile node from a 3GPP to a trusted non-3GPP network with PMIPv6, according to an embodiment of the second aspect of the invention.

One difference between this exemplary scenario and the previous scenario introduced with reference to FIG. 9 is in the intra non-3GPP access handover procedure. Thus, the different part is described below.

Figure 13:
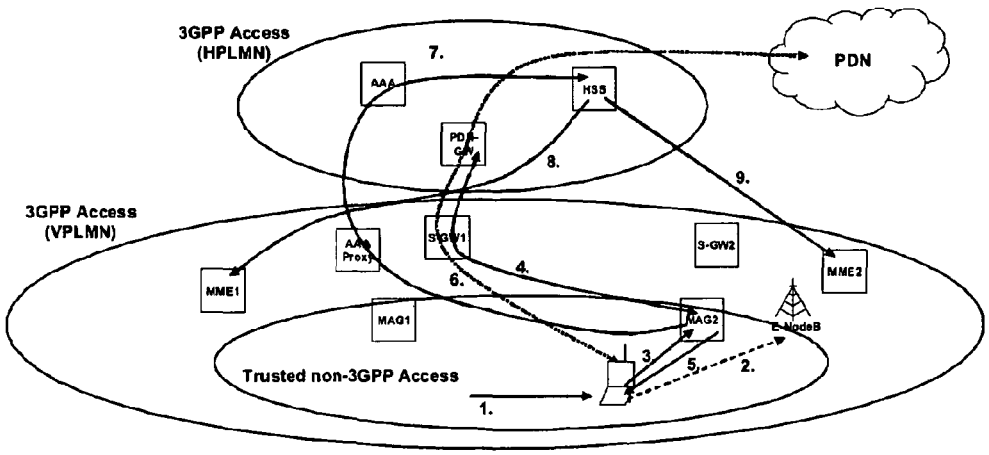
FIG. 13 shows an MME re-assignment Procedure for Intra trusted non-3GPP handovers.

Referring now to FIG. 13, the following steps are performed when a mobile terminal moves within the non-3GPP access:

1. The mobile terminal hands over within the trusted non-3GPP Access.
2. When the mobile terminal finds a new MAG (MAG2), the mobile terminal measures the 3GPP radio access and determines an MME2 based on the 3GPP measurements.
3. The mobile terminal attaches to the non-3GPP access network, i.e. authenticates towards the MAG2 with its decorated NAI including information about the determined MME2.
4. The MAG2 sends a PBU message to the PDN-GW via a S-GW1 which could be the same as the one used before and selected by the AAA Proxy and receives a PBA message.
5. The MAG2 notifies the mobile terminal of a network prefix or an IP address assigned by the PDN-GW. The mobile terminal completes L3 Attach in the non-3GPP access network.
6. The user data flow is re-routed to/from mobile terminal attached to the MAG2 in the non-3GPP access.
7. The MAG2 notifies the HSS about the new MME2 for the mobile terminal using a message based on the AAA infrastructure. This notification may be routed via AAA Proxy in the VPLMN and the AAA Server in the HPLMN to the HSS.
8. The HSS requests the old MME1 to delete the context for the mobile terminal.
9. The HSS pushes context for the mobile terminal to the new MME2.

The steps hereafter are the same as steps from 10 to 14 in the previous embodiment of the invention discussed with reference to FIG. 11.

Below there will be explained still another embodiment of the invention for the S-GW relocation in the Chaining case. Now referring to FIG. 14, it is assumed in this exemplary scenario that the mobile terminal is active in the non-3GPP access and states have been established at a previous MME1. The mobile terminal is moving in the non-3GPP access and changes the point of attachment. The mobile terminal performs 3GPP measurements and informs the PDN-GW about the result of the measurements via the MAG contained in the "Non-3GPP" box, and the S-GW. The PDN-GW forwards the measurement result to the AAA server that determines the appropriate MME2. The mobile terminal is informed about the MME2 during re-authentication procedure and the S-GW relocation is performed. In this procedure, it is assumed that PMIPv6 is applied between the S-GW and the PDN-GW.

Figure 14:
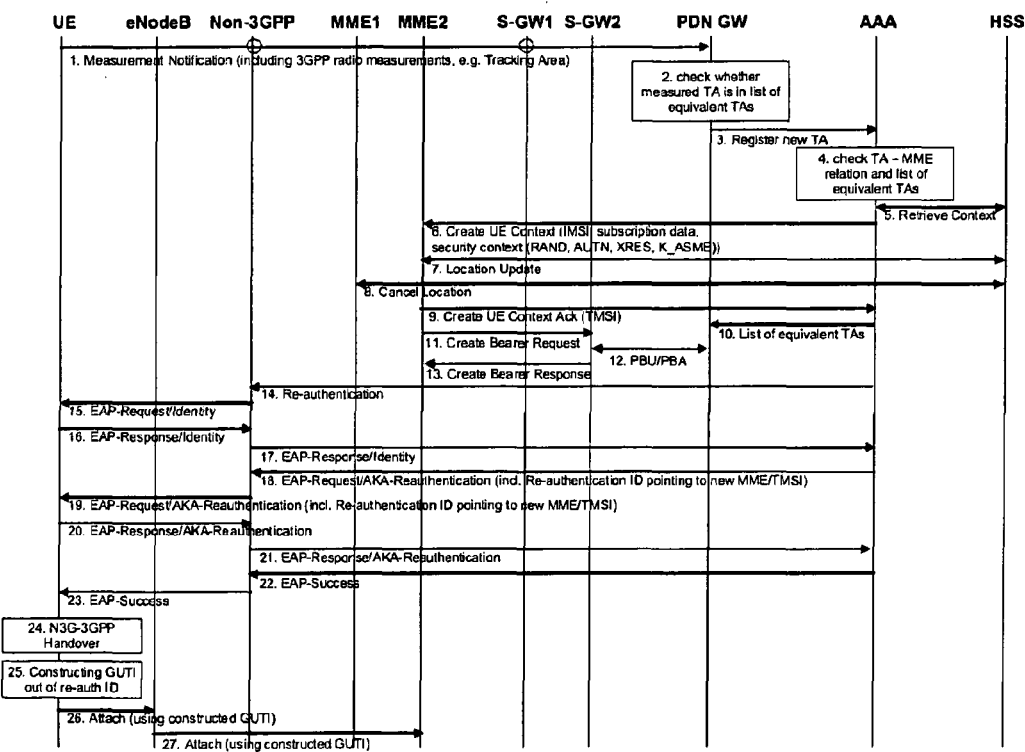
FIG. 14 illustrates an MME and S-GW re-assignment procedure with re-authentication-based MME notification according to a different embodiment of the second aspect of the invention.

The following steps are illustrated in FIG. 14.

1. The mobile terminal has moved in the non-3GPP access, attaches to the MAG in the non-3GPP access, and thus the MAG performs a Proxy Binding Update towards the PDN-GW via the S-GW1. The attach request message, sent by the mobile terminal to the MAG, and the Proxy Binding Update message include the results of the recently performed radio measurements by the mobile terminal (e.g. the discovered Tracking Area). The PDN-GW sends a Proxy Binding Acknowledgment back to the MAG.
2. The PDN-GW may check whether the new Tracking Area is in the list of equivalent Tracking Areas, i.e. whether it is served by the same or a different MME. No action is required, if the new TA is served by the same MME.
3. The TA is not in the list of the equivalent TAs, i.e. the new TA is not served by the same MME, thus the PDN-GW registers the new TA with the AAA server.
4. The AAA has access to a database where the relationship between Tracking Areas and MMEs is stored. The AAA server requests the database and determines the new MME and also all equivalent Tracking Areas.
5. If the AAA server is not updated with changes of mobile terminal context automatically from the HSS, it requests the context information, e.g. fresh authentication vectors, from the HSS.
6. The AAA server triggers the new MME to create a context for the mobile terminal. This request may comprise resource setup in other entities, e.g. setup of radio bearers in the RAN or setup of bearers in the S-GW.
7. The new MME sends an Update Location to the HSS, to inform the HSS that the mobile terminal is now served by the MME.
8. The HSS sends a trigger to the old MME to delete the context for the mobile terminal.
9. The new MME may allocate a new temporary identity (TMSI) for the mobile terminal, that uniquely identifies the mobile terminal in the MME, and may inform the AAA server about it.
10. The AAA server informs the PDN-GW about the list of equivalent TAs.
11. The MME2 selects the appropriate S-GW (S-GW2) and sends a Create Bearer Request message to the S-GW2. The S-GW2 may ask the S-GW1 to send relevant information of the mobile terminal such as BUL entry information to the S-GW2 in order to create an entry for the mobile terminal in the S-GW2's BUL based on the obtained information.
12. The S-GW2 may send a PBU message to the PDN-GW and receive a PBA message. By performing this step, the PDN-GW starts transferring the packets destined to the mobile terminal. However, as the mobile terminal has not started handover, those packets are lost. In order to avoid such packet loss, S-GW2 may request not to transfer until handover of the mobile terminal to the 3GPP access network is done. If the handover processing is known to be performed soon after, S-GW2 need not take such a request and buffers the packets destined to the mobile terminal until the handover is completed (strictly speaking, until Update Bearer Request/Response message processing after step 27 is done).
13. The S-GW2 sends a Create Bearer Response message to the MME2.
14. In order to inform the mobile terminal about the change of the MME, the AAA server starts re-authentication, i.e. it sends a re-authentication trigger to the non-3GPP access.
15. The non-3GPP access requests the mobile terminal to re-authenticate using EAP.
16. The mobile terminal starts authentication and provides its identity to the non-3GPP access.
17. The non-3GPP access forwards the authentication message from the mobile terminal to the AAA server in the 3GPP core network.
18. The AAA server starts EAP-AKA re-authentication and during the AKA procedure the AAA server includes in the EAP-Request/AKA-Reauthentication message in the AT_NEXT_REAUTH_ID attribute a new re-authentication id. The re-authentication id points to the new MME and may point to the new allocated TMSI.
19. The non-3GPP access forwards the EAP-Request to the mobile terminal.
20. The mobile terminal learns the new MME and new TMSI from the re-authentication id in the EAP-Request/AKA-Reauthentication message and sends the EAP-Response/AKA-Reauthentication to the non-3GPP access.
21. The non-3GPP access forwards the EAP-Response to the AAA server.
22. The AAA server informs the non-3GPP access that the EAP authentication is successful.
23. The non-3GPP forwards the EAP-success to the mobile terminal.
24. At some point in time, while being connected to the non-3GPP access, the mobile terminal decides to handover to 3GPP access.
25. The mobile terminal constructs the Global Unique Temporary Identifier (GUTI) using the MME identifier and TMSI from the re-authentication id.
26. The mobile terminal sends the Attach Request to the eNodeB including the constructed GUTI.
27. The eNodeB detects the appropriate MME from the GUTI and forwards the Attach Request to the MME that has the context for the mobile terminal.

Performing the above steps from 11 to 13 in advance to the handover can reduce the time to create a BUL entry for the mobile terminal and PMIPv6 tunnel between S-GW2 and PDN-GW during the actual handover.

Moreover, according to another different embodiment of the invention for the second aspect, in the following a procedure for one of the described options above is shown for the handover between 3GPP access and untrusted non-3GPP access with the S-GW relocation in the Chaining case. In this exemplary scenario it is assumed that the mobile terminal performs 3GPP measurements, the mobile terminal determines an MME based on the measurements and informs the MAG (ePDG in the VPLMN) in the non-3GPP access network about the MME using NAI decoration, and the MAG informs the core network about it with the Proxy Binding Update message via S-GW. In this procedure, it is assumed that PMIPv6 is applied between the S-GW and the PDN-GW.

Figure 15:
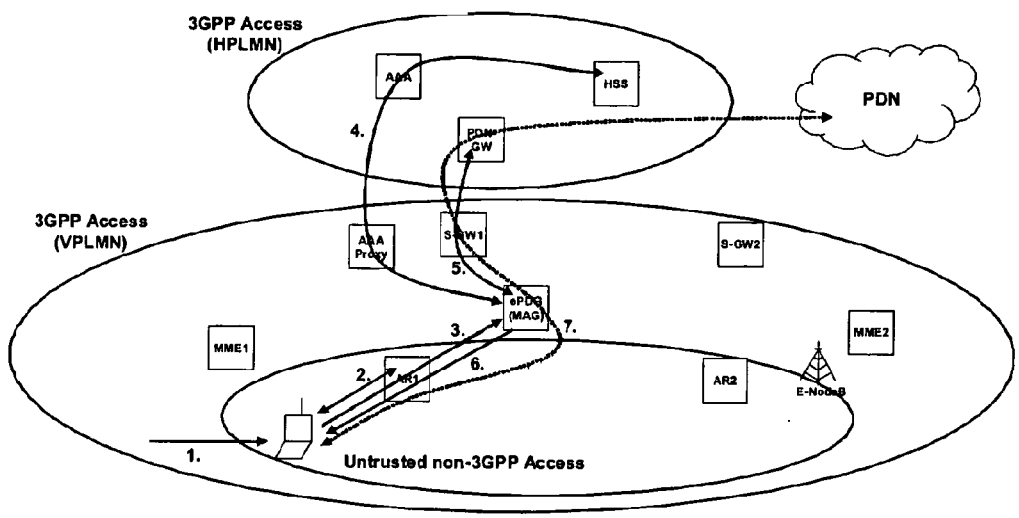
FIG. 15 shows the Attach procedure for a handover from 3GPP to an untrusted non-3GPP with PMIPv6 according to another embodiment of the second aspect of the invention.

Referring now to FIG. 15, the following steps are performed when a mobile terminal hands over from 3GPP access to untrusted non-3GPP access:
1. The mobile terminal was attached to MME1 in the 3GPP access network and hands over to the untrusted non-3GPP access.
2. The mobile terminal performs L3 Attach & Local IP Address Allocation with Access Router 1 (AR1) in the non-3GPP access.
3. The mobile terminal initiates establishing an IPsec tunnel with the ePDG in the VPLMN using the IKEv2 protocol.
4. The ePDG performs Authentication and Authorization for the mobile terminal with the 3GPP AAA server in the HPLMN via the AAA Proxy in the VPLMN. The 3GPP AAA server authenticates the mobile terminal. During authentication, the AAA Proxy may obtain the S-GW address which was used by the mobile terminal in the 3GPP access network from MME1 in order to reduce handover time caused by the S-GW selection. Furthermore, when no user data flow to/from the mobile terminal is seen for a determined time, the AAA Proxy may be triggered and performs relocation to a different S-GW selected solely by the AAA Proxy even when the AAA Proxy obtains the S-GW address from the MME.
5. The ePDG, also acting as a MAG, sends a Proxy Binding Update (PBU) message to the PDN-GW via the S-GW1 which is allocated by the AAA Proxy and receives a Proxy Binding Acknowledge (PBA) message.
6. The IPsec tunnel establishing is completed. The ePDG notifies the mobile terminal of a network prefix or an IP address assigned by the PDN-GW over the IPsec tunnel. The mobile terminal configures a remote IP address based on the information from the ePDG.
7. The user data flow is re-routed to/from mobile terminal attached to the AR1.

Figure 16:
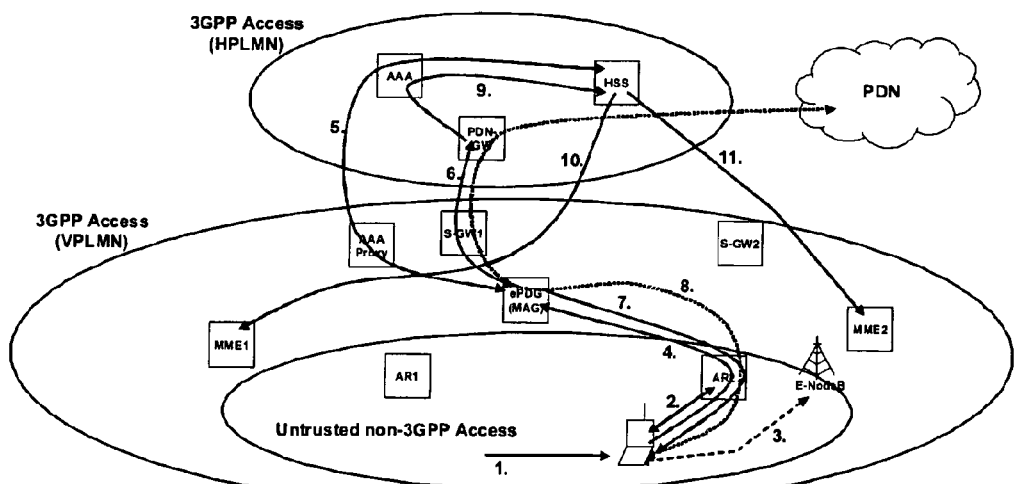
FIG. 16 shows an MME re-assignment Procedure for Intra untrusted non-3GPP handover according to another embodiment of the second aspect of the invention.

Referring now to FIG. 16, the following steps are performed when a mobile terminal moves within the non-3GPP access:

1. The mobile terminal hands over within the untrusted non-3GPP access.
2. The mobile terminal performs L3 Attach & Local IP Address Allocation with a new Access Router 2 (AR2).
3. The mobile terminal measures the 3GPP radio access and determines an MME2 based on the 3GPP measurements.
4. The mobile terminal initiates establishing an IPsec tunnel with the ePDG using the IKEv2 protocol (or updates the existing tunnel using MOBIKE) with its decorated NAI and including information about the determined MME2. In case the mobile terminal knows that Chaining is applied, it may also request not to perform the S-GW relocation now, in order to avoid disruption of ongoing sessions. The request is transferred to the MME2, e.g. via the HSS, and the MME2 decides not to perform the S-GW relocation procedure after step 12 in FIG. 17. In this case, the mobile terminal may request to perform the S-GW relocation to the ePDG after a part or all of the sessions terminate or request the MME2 to perform the S-GW relocation during handover procedure to the 3GPP access.
5. The ePDG performs Access Authentication and Authorization for the mobile terminal with the 3GPP AAA server in case the IKE/IPsec tunnel was established again. The 3GPP AAA server authenticates the mobile terminal.
6. The ePDG sends a Proxy Binding Update (PBU) message including the mobile terminal's decorated NAI containing information about the determined MME2 to the PDN-GW via the S-GW1 which is allocated by the AAA Proxy and receives a Proxy Binding Acknowledge (PBA) message. The decorated NAI can be alternatively notified to the AAA Server by the S-GW1 via the AAA Proxy at step 5. In such case, the AAA Proxy notifies the HSS about the MME2 for the mobile terminal based on the information contained in the decorated NAI at step 9 instead of the PDN-GW.
7. The IPsec tunnel establishing is completed. The ePDG notifies the mobile terminal of a network prefix or an IP address assigned by the PDN-GW over the IPsec tunnel. The mobile terminal may re-configure the remote IP address based on the information from the ePDG.
8. The user data flow is re-routed to/from mobile terminal attached to the AR2.
9. The PDN-GW notifies the HSS about the new MME 2 for the mobile terminal.
10. The HSS requests the old MME 1 to delete the context for the mobile terminal.
11. The HSS pushes context for the mobile terminal to the new MME 2. After completion of pushing the context to the MME2, the HSS may notify the mobile terminal of the completed MME relocation. The notification can be routed via the AAA Server, the PDN-GW, the S-GW, ePDG and AR2, or via the AAA Server, the AAA Proxy, the ePDG and AR2, to the mobile terminal. If the S-GW relocation is performed, the notification can be postponed until the S-GW relocation is done, i.e. step 12 in FIG. 17.

Figure 17:
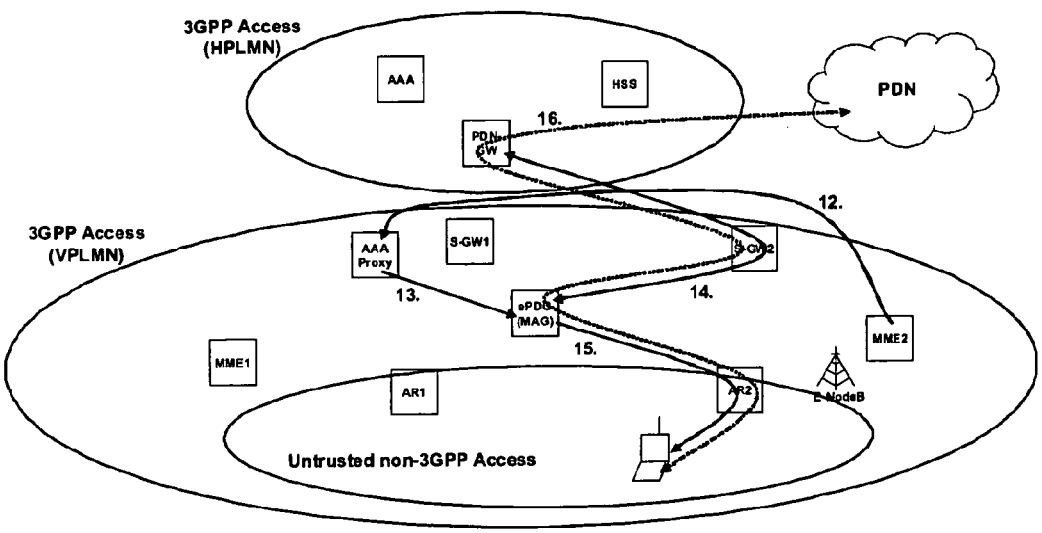
FIG. 17 shows a S-GW re-assignment Procedure for an Intra untrusted non-3GPP handover according to an embodiment of the second aspect of the invention.

Referring now to FIG. 17, the following steps are performed after the MME relocation (re-assignment) when a mobile terminal moves within the untrusted non-3GPP access:

12. If the MME2 knows that Chaining is applied or if the MME2 is indicated to perform the S-GW relocation by the HSS, the MME2 requests the AAA Proxy to perform the S-GW relocation from S-GW1 to S-GW2 which has been selected by the MME2. The MME2 can find out that Chaining is applied by asking the AAA Proxy or the HSS via the AAA Proxy and the AAA Server. In case that the GTP is applied between the S-GW and the PDN-GW, the MME2 may issue no trigger to the AAA proxy even if the Chaining is applied.
13. The AAA Proxy notifies the ePDG of the S-GW2 address and requests to switch to the S-GW2, and also notifies both or either of the S-GW1 and the S-GW2 to start transferring relevant information from S-GW1 to S-GW2. In this case, while sessions still being active in the route via S-GW1, in order to avoid interruption of ongoing sessions, data forwarding from the old S-GW1 to the new S-GW2 can be used.
14. The ePDG sends a PBU message to the PDN-GW via a S-GW2 and receives a PBA message. After the new connection is established with the new S-GW2, the PDN-GW may notify the HSS of the completion of connection establishment via the AAA Server. Then, the HSS may notify the mobile terminal of the completed S-GW relocation, so that the mobile terminal is aware of the successful S-GW relocation in the core network. The notification can be routed via the AAA Server, the PDN-GW, the S-GW, ePDG and AR2, or via the AAA Server, the AAA Proxy, the ePDG and AR2, to the mobile terminal.
15. The ePDG notifies the mobile terminal of a network prefix or an IP address assigned by the PDN-GW over the IPsec tunnel. The mobile terminal may re-configure the remote IP address based on the information from the ePDG.
16. The user data flow is re-routed to/from mobile terminal attached to the AR2 in the non-3GPP access.

Figure 18:
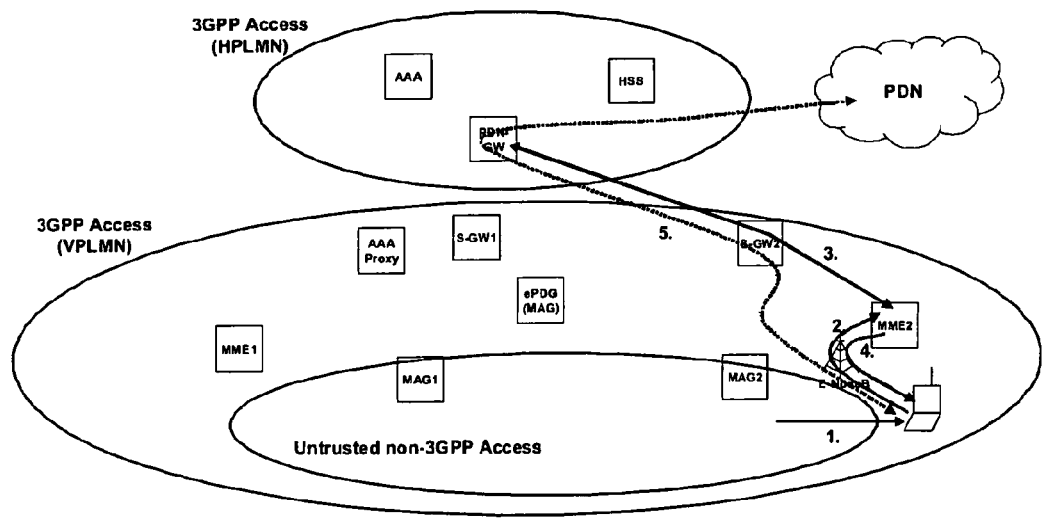
FIG. 18 shows an Attach procedure for handover from untrusted non-3GPP to 3GPP according to an embodiment of the second aspect of the invention

Referring now to FIG. 18, the following steps are performed when a mobile terminal hands over from a non-3GPP access to a 3GPP access:

1. The mobile terminal was attached to the AR2 in the non-3GPP access and hands over to the 3GPP Access.
2. The mobile terminal sends an Attach Request message to the eNodeB. The identifier used in the Attach Request (i.e. the GUTI) has a component that identifies the MME2. The eNodeB forwards the Attach Request to the MME2. The mobile terminal may add a flag which indicates not to re-select the MME and to use the MME of the identifier contained in the GUTI, i.e. MME2. Furthermore, if the mobile terminal knows the S-GW relocation was performed during the MME relocation procedure, the mobile terminal also indicates not to re-select the S-GW and use the current S-GW2.
3. The MME2 creates the bearers towards the PDN-GW via S-GW2 already selected. The S-GW2 setup PMIPv6 MAG configuration using the prepared context, i.e. BUL and tunnel with PDN-GW for the mobile terminal.
4. The MME2 establishes the radio bearers with the mobile terminal.
5. The user data flow is re-routed to/from the mobile terminal attached to the 3GPP access. In case of the S-GW relocation, while still being active in non-3GPP, in order to avoid interruption of ongoing sessions, data forwarding from the old S-GW to the new S-GW can be used.

The explanations given in the Technical Background section above are intended to better understand the specific exemplary embodiments described herein and should not be understood as limiting the invention to the described specific implementations of processes and functions in the mobile communication network. Nevertheless, the improvements proposed herein may be readily applied in the architectures/ systems described in the Technological Background section and may in some embodiments of the invention also make use of standard and improved procedures of theses architectures/systems. It would be appreciated by a person skilled in the art that numerous variations and/or modifications may be made to the present invention as shown in the specific embodiments without departing from the spirit or scope of the invention as broadly described.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

The invention claimed is:

1. A mobile node for preparing and performing its handover from a non-3GPP network area to a 3GPP network area, wherein the mobile node is attached to the non-3GPP network area, the mobile node comprising:
a processor adapted to determine the location of the mobile node,
the processor further adapted to determine a mobility management entity in the 3GPP network area based on the determined location of the mobile node,
a transmitter adapted to transmit information on the determined mobility management entity to an entity in the 3GPP network area or non-3GPP network area for registering the mobile node at the determined mobility management entity, and
the processor is adapted to perform the handover from the non-3GPP network area to the 3GPP network area while indicating the determined mobility management entity when attaching to the 3GPP network area.

2. The mobile node according to claim 1, wherein the processor uses a location-dependent address of the mobile node for determining the location of the mobile node.

3. The mobile node according to claim 1, wherein the processor is further adapted to trigger radio measurements on the non-3GPP network area or on the 3GPP network area at the location of the mobile node for determining the location of the mobile node.

4. The mobile node according to claim 3, wherein the radio measurements are conducted by an entity in the non-3GPP network area, and the processor is further adapted to instruct the entity in the non-3GPP network area about which radio measurements to conduct.

5. The mobile node according to claim 3, wherein the processor is adapted to calculate a likelihood for a handover of the mobile node from the non-3GPP network area to the 3GPP network area, and wherein the processor triggers the radio measurements when the calculated likelihood for a handover exceeds a predetermined level.

6. The mobile node according to claim 5, further comprising:
a memory adapted to store information on the network deployment of the non-3GPP network area and/or the 3GPP network area, and wherein the likelihood for a handover is calculated based on the stored information on the network deployment at the location of the mobile node, or
a receiver adapted to receive radio signals out of the non-3GPP network area, wherein the processor is further adapted to determine the signal strength of the received radio signal, and the likelihood for a handover of the mobile node increases with a decrease of the determined radio signal strength received out of the non-3GPP network area, or
a memory adapted to store moving patterns of the mobile node in the non-3GPP network area and/or the 3GPP network area, and wherein the processor is adapted to calculate the likelihood for a handover of the mobile node based on the previously stored moving patterns.

7. The mobile node according to claim 3, wherein the mobile node is registered in a previous mobility management entity in the 3GPP network area, and the processor is further adapted to calculate the likelihood for changing the previous mobility management entity to the mobility management entity, wherein the processor triggers the radio measurements when the calculated likelihood for changing the previous mobility management entity exceeds a predetermined level.

8. A method for performing a handover of a mobile node from a non-3GPP network to a 3GPP network, wherein the mobile node is connected to the non-3GPP network, the method comprising the steps of:
selecting, by an entity in the non-3GPP network, a mobility management entity (MME) in the 3GPP network based on a mapping from the current location of the mobile node in the non-3GPP network to corresponding MMEs;
forwarding, by the entity in the non-3GPP network, a message to the mobile node, the message including information on the MME;
switching, by the mobile node, to the 3GPP network; and;
sending, by the mobile node, a connection request message to an eNodeB in the 3GPP network, the connection request message including the information on the MME.

9. The method according to claim 8, wherein the entity in the non-3GPP network is a HRPD (High Rate Packet Data) access node.

10. The method according to claim 8, wherein the entity in the non-3GPP network is a non-3GPP access base station.

11. A mobile node for performing a handover from a non-3GPP network to a 3GPP network, wherein the mobile node is connected to the non-3GPP network, the mobile node comprising:
a receiver configured to receive a message including information on a mobility management entity (MME) from an entity in the non-3GPP network, the MME being selected by the entity in the non-3GPP network, based on a mapping from the current location of the mobile node in the non-3GPP network to corresponding MMEs;
a switching unit configured to switch to the 3GPP network; and
a transmitter configured to send a connection request message to an eNodeB in the 3GPP network, the connection request message including the information on the MME.

* * * * *